US011477794B2

(12) United States Patent
Nan et al.

(10) Patent No.: US 11,477,794 B2
(45) Date of Patent: Oct. 18, 2022

(54) DATA TRANSMISSION METHOD, COMMUNICATIONS APPARATUS, STORAGE MEDIUM, AND PROGRAM PRODUCT

(71) Applicant: HUAWEI TECHNOLOGIES CO., LTD., Guangdong (CN)

(72) Inventors: Fang Nan, Shenzhen (CN); Zheng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 17/060,757

(22) Filed: Oct. 1, 2020

(65) Prior Publication Data
US 2021/0022145 A1 Jan. 21, 2021

Related U.S. Application Data

(63) Continuation of application No. PCT/CN2018/082053, filed on Apr. 4, 2018.

(51) Int. Cl.
*H04W 72/04* (2009.01)
*H04W 4/80* (2018.01)

(52) U.S. Cl.
CPC ......... *H04W 72/0493* (2013.01); *H04W 4/80* (2018.02); *H04W 72/042* (2013.01); *H04W 72/0453* (2013.01)

(58) Field of Classification Search
CPC .. H04W 72/0493; H04W 4/80; H04W 72/042
See application file for complete search history.

(56) References Cited

U.S. PATENT DOCUMENTS

2016/0270038 A1\* 9/2016 Papasakellariou .... H04L 1/1887
2018/0248673 A1\* 8/2018 Bhattad ................. H04L 5/0055

FOREIGN PATENT DOCUMENTS

CN 106162889 A 11/2016
CN 107734692 A 2/2018
(Continued)

OTHER PUBLICATIONS

Huawei et al., "On Sub-RB Resource Allocation for MTC PUSCH", 3GPP TSG RAN WG1 Meeting #92, R1-1801432, Athens, Greece, Feb. 26-Mar. 2, 2018, 7 pages.
(Continued)

*Primary Examiner* — Samina F Choudhry
(74) *Attorney, Agent, or Firm* — Fish & Richardson P.C.

(57) ABSTRACT

This application describes a data transmission method, a communications apparatus, a storage medium, and a program product. In one example implementation, a network device is no longer confined to allocating an RB only in a narrowband to BL/CE UE, but can also allocate an RB outside the narrowband to the BL/CE UE, so that resources are flexibly allocated by the network device to the BL/CE UE. In this way, when the network device allocates resources to the BL/CE UE in one subframe, a quantity of fragmented resources that cannot be used by conventional UE in remaining resources in a system bandwidth can be reduced, so that the remaining resources can be used by other conventional UE to a maximum extent, thereby improving system resource utilization.

20 Claims, 5 Drawing Sheets

(56) References Cited

FOREIGN PATENT DOCUMENTS

RU          2638544 C2    12/2017
WO       2017057870 A1    4/2017

OTHER PUBLICATIONS

3GPP TS 36.211 V15.1.0 (Mar. 2018), 3rd Generation Partnership Project, Technical Specification Group Radio Access Network, Evolved Universal Terrestrial Radio Access (E-UTRA), Physical channels and modulation (Release 15), 221 pages.

3GPP TS 36.212 V15.1.0 (Mar. 2018), 3rd Generation Partnership Project, Technical Specification Group Radio Access Network, Evolved Universal Terrestrial Radio Access (E-UTRA), Multiplexing and channel coding (Release 15), 234 pages.

3GPP TS 36.213 V15.1.0 (Mar. 2018), 3rd Generation Partnership Project, Technical Specification Group Radio Access Network, Evolved Universal Terrestrial Radio Access (E-UTRA), Physical layer procedures (Release 15), 499 pages.

PCT International Search Report and Written Opinion in International Application No. PCT/CN2018/082,053, dated Dec. 12, 2018, 19 pages (With English Translation).

Office Action issued in Russian Application No. 2020136107/07(066563) dated Aug. 10, 2021, 19 pages (with English translation).

Extended European Search Report issued in European Application No. 18913905.8 dated Feb. 8, 2021, 9 pages.

Qualcomm Incorporated, "Flexible allocation for POSCH and PUSCH for efeMTC," 3GPP TSG RAN WG1 Meeting #92, R1-1802330, Athens, Greece, Feb. 26-Mar. 2, 2018, 6 pages.

ZTE, "Flexible starting PRB of PUSCH/POSCH for MTC," 3GPP TSG RAN WG1 Meeting #92, R1-1801601, Athens, Greece, Feb. 26-Mar. 2, 2018, 5 pages.

* cited by examiner

DATA TRANSMISSION METHOD, COMMUNICATIONS APPARATUS, STORAGE MEDIUM, AND PROGRAM PRODUCT

CROSS-REFERENCE TO RELATED APPLICATIONS

This application is a continuation of International Application No. PCT/CN2018/082053, filed on Apr. 4, 2018, the disclosure of which is hereby incorporated by reference in its entirety.

TECHNICAL FIELD

Embodiments of this application relate to communications technologies, and in particular, to a data transmission method, a communications apparatus, a storage medium, and a program product.

BACKGROUND

Machine type communication (MTC) is a communication mode in which various types of user equipment with specific capabilities of sensing, computing, execution, and communication are deployed to obtain information from a physical world and implement transmission, coordination, and processing of the information from the physical world over a network, so as to implement interconnection between humans and things and between things. Currently, in a long term evolution (LTE) communications system, user equipment (UE) supporting an MTC service includes bandwidth-reduced low-complexity UE (BL UE) and coverage enhancement UE (CE UE). The BL UE or the CE UE may work in a coverage enhancement mode A (CE mode A).

In LTE Release 13, a maximum transmit bandwidth and a maximum receive bandwidth that can be supported by the BL UE or the CE UE (BL/CE UE) are 1.4 MHz. A bandwidth of 1.4 MHz may include one narrowband, and the narrowband may include six resource blocks (RB) in frequency domain. Currently, a system bandwidth is divided into a plurality of narrowbands, so that a network device can allocate one RB or a plurality of consecutive RBs in one narrowband to the BL/CE UE by using downlink control information (DCI) for data transmission.

However, resources in the system bandwidth cannot be flexibly allocated in an existing manner of allocating resources to the BL/CE UE, thereby resulting in relatively low resource utilization in the system bandwidth.

SUMMARY

Embodiments of this application provide a data transmission method, a communications apparatus, a storage medium, and a program product, to resolve a technical problem in the prior art that resource utilization in a system bandwidth is relatively low because resources in the system bandwidth cannot be flexibly allocated in a manner of allocating resources to BL/CE UE.

According to a first aspect, an embodiment of this application provides a data transmission method, and the method includes:

receiving, by a first communications apparatus, downlink control information sent by a second communications apparatus, where the downlink control information includes a first bit and a second bit, when a value of the second bit is a value in a first set, a value of the first bit is used to indicate a narrowband allocated by the second communications apparatus to the first communications apparatus, the value of the second bit is used to indicate at least one resource block allocated by the second communications apparatus to the first communications apparatus, a quantity of the at least one resource block is less than or equal to a quantity of resource blocks included in the narrowband, and there is a resource block that does not belong to the narrowband in the at least one resource block, where the second bit is M bits, the first set includes N values, N is a positive integer less than $2^M$, and M is a positive integer; and sending, by the first communications apparatus, uplink data to the second communications apparatus on the at least one resource block, or receiving, on the at least one resource block, downlink data sent by the second communications apparatus.

According to the data transmission method provided in the first aspect, when the second communications apparatus is a network device and the first communications apparatus is BL/CE UE, the network device is no longer confined to allocating an RB only in a narrowband to the BL/CE UE, but may also allocate an RB outside the narrowband to the BL/CE UE, so that resources are more flexibly allocated by the network device to the BL/CE UE. In this way, when the network device allocates resources to the BL/CE UE in one subframe, the network device may flexibly select allocated resources based on a load status in a system, a quantity of fragmented resources that cannot be used by conventional UE in remaining resources in a system bandwidth can be reduced, so that the remaining resources can be used by conventional UE to a maximum extent, thereby improving system resource utilization.

In a possible design, when the value of the second bit does not belong to the first set, the value of the second bit is used to indicate the first communications apparatus to prematurely terminate monitoring of a downlink control channel and prematurely terminate sending of the uplink data to the second communications apparatus, or the value of the second bit is used to indicate the first communications apparatus to prematurely terminate monitoring of a downlink control channel and is used to indicate acknowledgment information of the second communications apparatus for the uplink data; and the first communications apparatus terminates monitoring of the downlink control channel and terminates sending of the uplink data to the second communications apparatus.

According to the data transmission method provided in this possible design, when the second communications apparatus is a network device and the first communications apparatus is BL/CE UE, after successfully receiving uplink data sent by the BL/CE UE, the network device may further instruct, by using another value of a second bit, the BL/CE UE to prematurely terminate monitoring of a downlink control channel and prematurely terminate sending of the uplink data to the network device, to prevent the BL/CE UE from continuing monitoring downlink control information indicating resources used for sending the uplink data and from continuing sending the uplink data, thereby reducing power consumption of the BL/CE UE and avoiding an increase in bit overheads of the downlink control channel.

In a possible design, when the value of the second bit does not belong to the first set, the value of the second bit is used to indicate the first communications apparatus to prematurely terminate sending of the uplink data to the second communications apparatus, or the value of the second bit is used to indicate acknowledgment information of the second communications apparatus for the uplink data; and the first communications apparatus terminates sending of the uplink data to the second communications apparatus.

According to the data transmission method provided in this possible design, when the second communications apparatus is a network device and the first communications apparatus is BL/CE UE, after successfully receiving uplink data sent by the BL/CE UE, the network device may further instruct, by using another value of a second bit, the BL/CE UE to prematurely terminate sending of the uplink data to the network device, to prevent the BL/CE UE from continuing sending the uplink data, thereby reducing power consumption of the BL/CE UE and avoiding an increase in bit overheads of a downlink control channel.

According to a second aspect, an embodiment of this application provides a data transmission method, and the method includes:

sending, by a second communications apparatus, downlink control information to a first communications apparatus, where the downlink control information includes a first bit and a second bit, when a value of the second bit is a value in a first set, a value of the first bit is used to indicate a narrowband allocated by the second communications apparatus to the first communications apparatus, the value of the second bit is used to indicate at least one resource block allocated by the second communications apparatus to the first communications apparatus, a quantity of the at least one resource block is less than or equal to a quantity of resource blocks included in the narrowband, and there is a resource block that does not belong to the narrowband in the at least one resource block, where the second bit is M bits, the first set includes N values, N is a positive integer less than $2^M$, and M is a positive integer; and receiving, by the second communications apparatus on the at least one resource block, uplink data sent by the first communications apparatus, or sending downlink data to the first communications apparatus on the at least one resource block.

In a possible design, when the value of the second bit does not belong to the first set, the value of the second bit is used to indicate the first communications apparatus to prematurely terminate monitoring of a downlink control channel and prematurely terminate sending of the uplink data to the second communications apparatus, or the value of the second bit is used to indicate the first communications apparatus to prematurely terminate monitoring of a downlink control channel and is used to indicate acknowledgment information of the second communications apparatus for the uplink data; and the second communications apparatus terminates sending of the downlink control channel to the first communications apparatus and terminates receiving of the uplink data.

In a possible design, when the value of the second bit does not belong to the first set, the value of the second bit is used to indicate the first communications apparatus to prematurely terminate sending of the uplink data to the second communications apparatus, or the value of the second bit is used to indicate acknowledgment information of the second communications apparatus for the uplink data; and the second communications apparatus terminates receiving of the uplink data.

For beneficial effects of the data transmission method provided in the second aspect and the possible designs of the second aspect, refer to the beneficial effects brought by the first aspect and the possible designs of the first aspect. Details are not described herein again.

According to a third aspect, an embodiment of this application provides a communications apparatus, and the communications apparatus includes:

a receiving module, configured to receive downlink control information sent by a second communications apparatus, where the downlink control information includes a first bit and a second bit, when a value of the second bit is a value in a first set, a value of the first bit is used to indicate a narrowband allocated by the second communications apparatus, the value of the second bit is used to indicate at least one resource block allocated by the second communications apparatus, a quantity of the at least one resource block is less than or equal to a quantity of resource blocks included in the narrowband, and there is a resource block that does not belong to the narrowband in the at least one resource block, where the second bit is M bits, the first set includes N values, N is a positive integer less than $2^M$, and M is a positive integer; and a processing module, configured to: control a sending module to send uplink data to the second communications apparatus on the at least one resource block, or control the receiving module to receive, on the at least one resource block, downlink data sent by the second communications apparatus.

In a possible design, when the value of the second bit does not belong to the first set, the value of the second bit is used to indicate to prematurely terminate monitoring of a downlink control channel and prematurely terminate sending of the uplink data to the second communications apparatus, or the value of the second bit is used to indicate to prematurely terminate monitoring of a downlink control channel and is used to indicate acknowledgment information of the second communications apparatus for the uplink data; and the processing module is further configured to prematurely terminate monitoring of the downlink control channel and control the sending module to terminate sending of the uplink data to the second communications apparatus.

In a possible design, when the value of the second bit does not belong to the first set, the value of the second bit is used to indicate to prematurely terminate sending of the uplink data to the second communications apparatus, or the value of the second bit is used to indicate acknowledgment information of the second communications apparatus for the uplink data; and the processing module is further configured to control the sending module to terminate sending of the uplink data to the second communications apparatus.

For beneficial effects of the communications apparatus provided in the third aspect and the possible designs of the third aspect, refer to the beneficial effects brought by the first aspect and the possible designs of the first aspect. Details are not described herein again.

According to a fourth aspect, an embodiment of this application provides a communications apparatus, and the communications apparatus includes:

a sending module, configured to send downlink control information to a first communications apparatus, where the downlink control information includes a first bit and a second bit, when a value of the second bit is a value in a first set, a value of the first bit is used to indicate a narrowband allocated to the first communications apparatus, the value of the second bit is used to indicate at least one resource block allocated to the first communications apparatus, a quantity of the at least one resource block is less than or equal to a quantity of resource blocks included in the narrowband, and there is a resource block that does not belong to the narrowband in the at least one resource block, where the second bit is M bits, the first set includes N values, N is a positive integer less than $2^M$, and M is a positive integer; and a processing module, configured to: control a receiving module to receive, on the at least one resource block, uplink data sent by the first communications apparatus, or control the sending module to send downlink data to the first communications apparatus on the at least one resource block.

In a possible design, when the value of the second bit does not belong to the first set, the value of the second bit is used to indicate the first communications apparatus to prematurely terminate monitoring of a downlink control channel and prematurely terminate sending of the uplink data, or the value of the second bit is used to indicate the first communications apparatus to prematurely terminate monitoring of a downlink control channel and is used to indicate acknowledgment information for the uplink data, and the processing module is further configured to: control the sending module to terminate sending of the downlink control channel to the first communications apparatus, and control the receiving module to terminate receiving of the uplink data.

In a possible design, when the value of the second bit does not belong to the first set, the value of the second bit is used to indicate the first communications apparatus to prematurely terminate sending of the uplink data, or the value of the second bit is used to indicate acknowledgment information for the uplink data; and the processing module is further configured to control the receiving module to terminate receiving of the uplink data.

For beneficial effects of the communications apparatus provided in the fourth aspect and the possible designs of the fourth aspect, refer to the beneficial effects brought by the first aspect and the possible designs of the first aspect. Details are not described herein again.

With reference to the first aspect, the second aspect, the third aspect, or the fourth aspect, in a possible design, M is equal to 5, each of the N values is greater than 20 and less than or equal to 31, and N is greater than or equal to 1 and less than or equal to 9.

In this possible design, when the second communications apparatus is a network device and the first communications apparatus is BL/CE UE, the network device may keep an existing downlink control information format or a bit quantity unchanged, and indicate allocated RBs including an RB outside an indicated narrowband to the BL/CE UE by using an unused bit value of a bit included in existing downlink control information, thereby avoiding an increase in bit overheads of the downlink control information.

With reference to the first aspect, the second aspect, the third aspect, or the fourth aspect, in a possible design, a smallest number of a resource block included in the narrowband is n, a largest number of a resource block included in the narrowband is n+5, a smallest number of a resource block in the at least one resource block is s, and a largest number of a resource block in the at least one resource block is t; and the resource block numbered s is a resource block with a smallest number in a resource block group, and s is a maximum value less than n; or the resource block numbered t is a resource block with a largest number in a resource block group, and t is a minimum value greater than n+5.

In this possible design, when the second communications apparatus is a network device and the first communications apparatus is BL/CE UE, the network device allocates, to the BL/CE UE, resources aligned with a boundary of an RBG, to reduce, as much as possible, a quantity of fragmented resources that cannot be used by conventional UE in remaining resources in a system bandwidth, so that the remaining resource can be used by other conventional UE to a maximum extent, thereby improving system resource utilization.

With reference to the first aspect, the second aspect, the third aspect, or the fourth aspect, in a possible design, that the value of the second bit is used to indicate at least one resource block allocated by the second communications apparatus to the first communications apparatus includes:

the at least one resource block allocated by the second communications apparatus to the first communications apparatus is indicated based on a correspondence between the value of the second bit, the smallest number of the resource block in the at least one resource block indicated by the value, and a quantity of consecutive resource blocks included in the at least one resource block.

In this possible design, when the second communications apparatus is a network device and the first communications apparatus is BL/CE UE, the network device may indicate, based on a correspondence between a value of a second bit, and a smallest number of a resource block in at least one resource block indicated by the value and a quantity of consecutive resource blocks included in the at least one resource block, the at least one resource block allocated by the network device to the BL/CE UE. In this way, the network device can flexibly indicate the at least one resource block by using the value of the second bit, thereby expanding an application scenario.

With reference to the first aspect, the second aspect, the third aspect, or the fourth aspect, in a possible design, the correspondence between the value of the second bit, the smallest number of the resource block in the at least one resource block indicated by the value of the second bit, and the quantity of consecutive resource blocks included in the at least one resource block includes one or more items in the following table, and any one of the items includes a value of the second bit, a smallest number of a resource block in at least one resource block, and a quantity of consecutive resource blocks included in the at least one resource block:

| Value of the second bit | Smallest number of the resource block in the at least one resource block | Quantity of consecutive resource blocks included in the at least one resource block |
| --- | --- | --- |
| Value of the second bit | s | 2 |
| Value of the second bit | s | 3 |
| Value of the second bit | s | 4 |
| Value of the second bit | s | 5 |
| Value of the second bit | s or t-5 | 6 |
| Value of the second bit | t-4 | 5 |
| Value of the second bit | t-3 | 4 |
| Value of the second bit | t-2 | 3 |
| Value of the second bit | t-1 | 2 |

In this possible design, when the second communications apparatus is a network device and the first communications apparatus is BL/CE UE, the network device indicates at least one resource block based on a correspondence between a value of a second bit, and a smallest number of a resource block in the at least one resource block indicated by the value and a quantity of consecutive resource blocks included in the at least one resource block, and at least one side of the at least one resource block is aligned with a boundary of an RBG. In this resource allocation manner, a quantity of fragmented resources that cannot be used by conventional UE in remaining resources in a system bandwidth can be reduced as much as possible, so that the remaining resources can be used by other conventional UE to a maximum extent, thereby improving system resource utilization.

With reference to the first aspect, the second aspect, the third aspect, or the fourth aspect, in a possible design, that the value of the second bit is used to indicate at least one resource block allocated by the second communications apparatus to the first communications apparatus includes:

the at least one resource block allocated by the second communications apparatus to the first communications apparatus is indicated based on a correspondence between the value of the second bit and the at least one resource block indicated by the value of the second bit.

In this possible design, when the second communications apparatus is a network device and the first communications apparatus is BL/CE UE, the network device may indicate, by using a correspondence between a value of a second bit and at least one resource block indicated by the value, the at least one resource block allocated by the network device to the BL/CE UE. In this way, the network device can flexibly indicate the at least one resource block by using the value of the second bit, thereby expanding an application scenario.

With reference to the first aspect, the second aspect, the third aspect, or the fourth aspect, in a possible design, the correspondence between the value of the second bit and the at least one resource block indicated by the value of the second bit includes one or more items in any one of the following tables, and any one of the items includes a value of the second bit and at least one resource block corresponding to the value of the second bit:

| First correspondence table | |
|---|---|
| Value of the second bit | At least one resource block |
| Value of the second bit | Resource blocks numbered n − 1 and n |
| Value of the second bit | Resource blocks numbered n − 1, n, and n + 1 |
| Value of the second bit | Resource blocks numbered n − 1, n, n + 1, and n + 2 |
| Value of the second bit | Resource blocks numbered n − 1, n, n + 1, n + 2, and n + 3 |
| Value of the second bit | Resource blocks numbered n − 1, n, n + 1, n + 2, n + 3, and n + 4, or resource blocks numbered n + 1, n + 2, n + 3, n + 4, n + 5, and n + 6 |
| Value of the second bit | Resource blocks numbered n + 2, n + 3, n + 4, n + 5, and n + 6 |
| Value of the second bit | Resource blocks numbered n + 3, n + 4, n + 5, and n + 6 |
| Value of the second bit | Resource blocks numbered n + 4, n + 5, and n + 6 |
| Value of the second bit | Resource blocks numbered n + 5 and n + 6 |

| Second correspondence table | |
|---|---|
| Value of the second bit | At least one resource block |
| Value of the second bit | Resource block numbered n − 1 or resource block numbered n − 2 |
| Value of the second bit | Resource blocks numbered n − 2 and n − 1 |
| Value of the second bit | Resource blocks numbered n − 1, n, and n + 1, or resource blocks numbered n − 2, n − 1, and n |
| Value of the second bit | Resource blocks numbered n − 2, n − 1, n, and n + 1 |
| Value of the second bit | Resource blocks numbered n − 1, n, n + 1, n + 2, and n + 3, or resource blocks numbered n − 2, n − 1, n, n + 1, and n + 2 |
| Value of the second bit | Resource blocks numbered n − 2, n − 1, n, n + 1, n + 2, and n + 3 |
| Value of the second bit | Resource blocks numbered n + 2, n + 3, n + 4, n + 5, and n + 6 |
| Value of the second bit | Resource blocks numbered n + 4, n + 5, and n + 6 |
| Value of the second bit | Resource block numbered n + 6 |

| Third correspondence table | |
|---|---|
| Value of the second bit | At least one resource block |
| Value of the second bit | Resource blocks numbered n − 1 and n |
| Value of the second bit | Resource blocks numbered n − 1, n, and n + 1 |
| Value of the second bit | Resource blocks numbered n − 1, n, n + 1, and n + 2 |
| Value of the second bit | Resource blocks numbered n − 1, n, n + 1, n + 2, and n + 3 |
| Value of the second bit | Resource blocks numbered n − 1, n, n + 1, n + 2, n + 3, and n + 4, or resource blocks numbered n + 2, n + 3, n + 4, n + 5, n + 6, and n + 7 |
| Value of the second bit | Resource blocks numbered n + 3, n + 4, n + 5, n + 6, and n + 7 |
| Value of the second bit | Resource blocks numbered n + 4, n + 5, n + 6, and n + 7 |
| Value of the second bit | Resource blocks numbered n + 5, n + 6, and n + 7 |
| Value of the second bit | Resource blocks numbered n + 6 and n + 7 |

| Fourth correspondence table | |
|---|---|
| Value of the second bit | At least one resource block |
| Value of the second bit | Resource blocks numbered n − 1 and n |
| Value of the second bit | Resource blocks numbered n − 1, n, and n + 1 |
| Value of the second bit | Resource blocks numbered n − 1, n, n + 1, and n + 2 |
| Value of the second bit | Resource blocks numbered n − 1, n, n + 1, n + 2, and n + 3 |
| Value of the second bit | Resource blocks numbered n − 1, n, n + 1, n + 2, n + 3, and n + 4 |
| Value of the second bit | Resource blocks numbered n + 2, n + 3, n + 4, n + 5, and n + 6 |
| Value of the second bit | Resource blocks numbered n + 3, n + 4, n + 5, and n + 6 |
| Value of the second bit | Resource blocks numbered n + 5 and n + 6 |
| Value of the second bit | Resource block numbered n + 6 |

| Fifth correspondence table | |
|---|---|
| Value of the second bit | At least one resource block |
| Value of the second bit | Resource blocks numbered n − 3 and n − 2 |
| Value of the second bit | Resource blocks numbered n − 3, n − 2, and n − 1 |
| Value of the second bit | Resource blocks numbered n − 3, n − 2, n − 1, and n |
| Value of the second bit | Resource blocks numbered n − 3, n − 2, n − 1, n, and n + 1 |
| Value of the second bit | Resource blocks numbered n − 1, n, n + 1, n + 2, n + 3, and n + 4, or resource blocks numbered n + 1, n + 2, n + 3, n + 4, n + 5, and n + 6 |
| Value of the second bit | Resource blocks numbered n + 4, n + 5, n + 6, n + 7, and n + 8 |
| Value of the second bit | Resource blocks numbered n + 5, n + 6, n + 7, and n + 8 |

-continued

Fifth correspondence table

| Value of the second bit | At least one resource block |
| --- | --- |
| Value of the second bit | Resource blocks numbered n + 6, n + 7, and n + 8 |
| Value of the second bit | Resource blocks numbered n + 7 and n + 8 |

Sixth correspondence table

| Value of the second bit | At least one resource block |
| --- | --- |
| Value of the second bit | Resource blocks numbered n − 2 and n − 1 |
| Value of the second bit | Resource blocks numbered n − 2, n − 1, and n |
| Value of the second bit | Resource blocks numbered n − 2, n − 1, n, and n + 1 |
| Value of the second bit | Resource blocks numbered n − 2, n − 1, n, n + 1, and n + 2 |
| Value of the second bit | Resource blocks numbered n − 2, n − 1, n, n + 1, n + 2, and n + 3 |

Seventh correspondence table

| Value of the second bit | At least one resource block |
| --- | --- |
| Value of the second bit | Resource blocks numbered n + 2, n + 3, n + 4, n + 5, n + 6, and n + 7 |
| Value of the second bit | Resource blocks numbered n + 3, n + 4, n + 5, n + 6, and n + 7 |
| Value of the second bit | Resource blocks numbered n + 4, n + 5, n + 6, and n + 7 |
| Value of the second bit | Resource blocks numbered n + 5, n + 6, and n + 7 |
| Value of the second bit | Resource blocks numbered n + 6 and n + 7 |

Eighth correspondence table

| Value of the second bit | At least one resource block |
| --- | --- |
| Value of the second bit | Resource blocks numbered n + 1, n + 2, n + 3, n + 4, n + 5, and n + 6 |
| Value of the second bit | Resource blocks numbered n + 2, n + 3, n + 4, n + 5, and n + 6 |
| Value of the second bit | Resource blocks numbered n + 3, n + 4, n + 5, and n + 6 |
| Value of the second bit | Resource blocks numbered n + 4, n + 5, and n + 6 |
| Value of the second bit | Resource blocks numbered n + 5 and n + 6 |

Ninth correspondence table

| Value of the second bit | At least one resource block |
| --- | --- |
| Value of the second bit | Resource blocks numbered n − 1 and n |
| Value of the second bit | Resource blocks numbered n − 1, n, and n + 1 |
| Value of the second bit | Resource blocks numbered n − 1, n, n + 1, and n + 2 |
| Value of the second bit | Resource blocks numbered n − 1, n, n + 1, n + 2, and n + 3 |
| Value of the second bit | Resource blocks numbered n − 1, n, n + 1, n + 2, n + 3, and n + 4 |

Resource blocks included in the narrowband are resource blocks numbered n, n+1, n+2, n+3, n+4, and n+5.

In this possible design, when the second communications apparatus is a network device and the first communications apparatus is BL/CE UE, the network device indicates, by using any one or more correspondences in the first correspondence table to the ninth correspondence table, at least one resource block allocated to the BL/CE UE. In this way, the network device can allocate different resource blocks to the BL/CE UE based on different scenarios, to reduce, as much as possible, a quantity of fragmented resources that cannot be used by conventional UE in remaining resources in a system bandwidth, so that the remaining resources can be used by other conventional UE to a maximum extent, thereby improving system resource utilization.

With reference to the first aspect, the second aspect, the third aspect, or the fourth aspect, in a possible design, when a system bandwidth is 3 MHz and an index of the narrowband is 0, the correspondence between the value of the second bit and the at least one resource block indicated by the value is one or more items in the first correspondence table;

when a system bandwidth is 3 MHz and an index of the narrowband is 1, the correspondence between the value of the second bit and the at least one resource block indicated by the value is one or more items in the second correspondence table;

when a system bandwidth is 5 MHz and an index of the narrowband is 2, the correspondence between the value of the second bit and the at least one resource block indicated by the value is one or more items in the first correspondence table;

when a system bandwidth is 5 MHz and an index of the narrowband is 3, the correspondence between the value of the second bit and the at least one resource block indicated by the value is one or more items in the ninth correspondence table or one or more items in the first correspondence table;

when a system bandwidth is 10 MHz and an index of the narrowband is 0, 1, 2, 3, 4, 5, and/or 6, the correspondence between the value of the second bit and the at least one resource block indicated by the value is one or more items in the third correspondence table;

when a system bandwidth is 10 MHz and an index of the narrowband is 7, the correspondence between the value of the second bit and the at least one resource block indicated by the value is one or more items in the fourth correspondence table or one or more items in the first correspondence table;

when a system bandwidth is 15 MHz and an index of the narrowband is 0, 2, and/or 4, the correspondence between the value of the second bit and the at least one resource block indicated by the value is one or more items in the first correspondence table;

when a system bandwidth is 15 MHz and an index of the narrowband is 1, 3, and/or 5, the correspondence between the value of the second bit and the at least one resource block indicated by the value is one or more items in the fifth correspondence table;

when a system bandwidth is 15 MHz and an index of the narrowband is 6, 8, and/or 10, the correspondence between the value of the second bit and the at least one resource block indicated by the value is one or more items in the sixth correspondence table;

when a system bandwidth is 15 MHz and an index of the narrowband is 7 and/or 9, the correspondence between the value of the second bit and the at least one resource block indicated by the value is one or more items in the seventh correspondence table or one or more items in the third correspondence table;

when a system bandwidth is 15 MHz and an index of the narrowband is 11, the correspondence between the value of the second bit and the at least one resource block indicated by the value is one or more items in the eighth correspondence table or one or more items in the first correspondence table;

when a system bandwidth is 20 MHz and an index of the narrowband is 0, 2, 4, 6, 8, 10, 12, and/or 14, the correspondence between the value of the second bit and the at least one resource block indicated by the value is one or more items in the sixth correspondence table; and/or when a system bandwidth is 20 MHz and an index of the narrowband is 1, 3, 5, 7, 9, 11, 13, and/or 15, the correspondence between the value of the second bit and the at least one resource block indicated by the value is one or more items in the seventh correspondence table or one or more items in the third correspondence table.

In this possible design, when the second communications apparatus is a network device and the first communications apparatus is BL/CE UE, if the network device indicates resources of different narrowbands to the BL/CE UE in different system bandwidths, the network device may indicate, by using any one or more correspondences in the first correspondence table to the ninth correspondence table, at least one resource block allocated to the BL/CE UE. In this way, the network device can allocate different resource blocks to the BL/CE UE based on different scenarios, to reduce, as much as possible, a quantity of fragmented resources that cannot be used by conventional UE in remaining resources in a system bandwidth, so that the remaining resources can be used by other conventional UE to a maximum extent, thereby improving system resource utilization.

With reference to the first aspect, the second aspect, the third aspect, or the fourth aspect, in a possible design, that each of the N values is greater than 20 and less than or equal to 31, and N is greater than or equal to 1 and less than or equal to 9 includes:

the N values are one or more of {21, 22, 23, 24, 25, 26, 27, 28, 29};

the N values are one or more of {22, 23, 24, 25, 26, 27, 28, 29, 30};

the N values are one or more of {22, 23, 24, 25, 27, 28, 29, 30, 31}; or the N values are one or more of {21, 22, 25, 26, 27, 28, 29, 30, 31}.

In this possible design, when the second communications apparatus is a network device and the first communications apparatus is BL/CE UE, the network device may keep an existing downlink control information format or a bit quantity unchanged, and indicate allocated RBs including an RB outside an indicated narrowband to the BL/CE UE by using an unused bit value of a bit included in existing downlink control information, thereby avoiding an increase in bit overheads of the downlink control information and improving detection performance of the downlink control information.

With reference to the first aspect, the second aspect, the third aspect, or the fourth aspect, in a possible design, a coverage enhancement mode of the first communications apparatus is a coverage enhancement mode A.

According to a fifth aspect, an embodiment of this application provides a communications apparatus. The communications apparatus has a function of implementing behavior of the second communications apparatus (a network device or a chip in a network device) in the foregoing method design. The function may be implemented by hardware, or may be implemented by hardware executing corresponding software. The hardware or the software includes one or more modules corresponding to the foregoing function.

In a possible design, a structure of the communications apparatus includes a processor, a transmitter, and a receiver. The processor is configured to support the communications apparatus in performing a corresponding function in the foregoing method. The transmitter and the receiver are configured to support communication between the communications apparatus and a first communications apparatus (BL/CE UE or a chip in BL/CE UE), for example, sending downlink control information in the foregoing method to the first communications apparatus, and performing data transmission with the first communications apparatus on at least one resource block. The communications apparatus may further include a memory. The memory is coupled to the processor, and is configured to store a program instruction and data that are necessary for the communications apparatus. The processor controls a receiving action of the receiver, and the processor controls a sending action of the transmitter.

According to a sixth aspect, an embodiment of this application provides a communications apparatus. The communications apparatus has a function of implementing behavior of the first communications apparatus (BL/CE UE or a chip in BL/CE UE) in the foregoing method design. The function may be implemented by hardware, or may be implemented by hardware executing corresponding software. The hardware or the software includes one or more modules corresponding to the foregoing function. The module may be software and/or hardware.

In a possible design, a structure of the communications apparatus includes a receiver, a transmitter, and a processor. The transmitter and the receiver are configured to support communication between the communications apparatus and a second communications apparatus (a network device or a chip in a network device), for example, receiving downlink control information in the foregoing method sent by the second communications apparatus, and performing data transmission with the second communications apparatus on at least one resource block. The communications apparatus may further include a memory. The memory is coupled to the processor, and is configured to store a program instruction and data that are necessary for the communications apparatus. The processor controls a receiving action of the receiver, and the processor controls a sending action of the transmitter.

According to a seventh aspect, an embodiment of this application provides a communications apparatus, including units, modules, or circuits configured to perform the method provided in the first aspect or the possible designs of the first aspect. The communications apparatus may be UE, or may be a module applied to UE, for example, may be a chip applied to the UE.

According to an eighth aspect, an embodiment of this application provides a communications apparatus, including units, modules, or circuits configured to perform the method provided in the second aspect or the possible designs of the second aspect. The communications apparatus may be a network device, or may be a module applied to a network device, for example, may be a chip applied to the network device.

According to a ninth aspect, an embodiment of this application provides a computer program product including an instruction. When the computer program product runs on a computer, the computer is enabled to perform the method in the first aspect or the possible designs of the first aspect.

According to a tenth aspect, an embodiment of this application provides a computer program product including an instruction. When the computer program product runs on a computer, the computer is enabled to perform the method in the second aspect or the possible designs of the second aspect.

According to an eleventh aspect, an embodiment of this application provides a computer-readable storage medium. The computer-readable storage medium stores an instruction, and when the instruction runs on a computer, the computer is enabled to perform the method in the first aspect or the possible designs of the first aspect.

According to a twelfth aspect, an embodiment of this application provides a computer-readable storage medium. The computer-readable storage medium stores an instruction, and when the instruction runs on a computer, the computer is enabled to perform the method in the second aspect or the possible designs of the second aspect.

According to the data transmission method, the communications apparatus, the storage medium, and the program product provided in the embodiments of this application, a network device is no longer confined to allocating an RB only in a narrowband to BL/CE UE, but may also allocate an RB outside the narrowband to the BL/CE UE, so that resources are more flexibly allocated by the network device to the BL/CE UE. In this way, when the network device allocates resources to the BL/CE UE in one subframe, a quantity of fragmented resources that cannot be used by conventional UE in remaining resources in a system bandwidth can be reduced, so that the remaining resources can be used by other conventional UE to a maximum extent, thereby improving system resource utilization.

DESCRIPTION OF EMBODIMENTS

Figure 1:
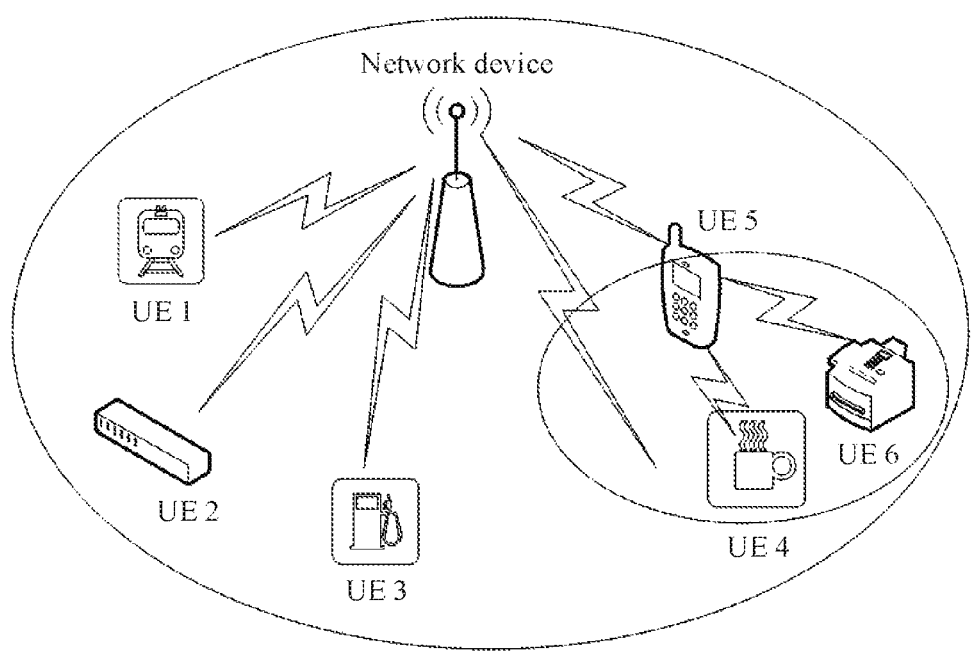
FIG. 1 is a schematic architectural diagram of a communications system to which an embodiment of this application is applied.

FIG. 1 is a schematic architectural diagram of a communications system to which an embodiment of this application is applied. As shown in FIG. 1, the communications system may include at least one network device and a plurality of UEs. The UE is connected to the network device in a wireless or wired manner. The UE may be at a fixed position, or may be movable. FIG. 1 is merely a schematic diagram, and the communications system may further include other network devices, for example, may further include a wireless relay device and a wireless backhaul device that are not drawn in FIG. 1.

The network device may be an access device used by the UE to access the communications system, or may be a network side NodeB, an evolved network side eNodeB, a network side in a 5G mobile communications system, a network side in a future mobile communications system, an access node in a Wi-Fi system, or the like. A specific technology and a specific device form used by the network device are not limited in the embodiments of this application.

The UE may also be referred to as a terminal, a mobile station (MS), a mobile terminal (MT), or the like. The UE may be a mobile phone, a tablet computer (Pad), a computer with a wireless sending/receiving function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

The network device and the UE each may be deployed on land, indoor or outdoor, or may be handheld or vehicle-mounted; or may be deployed on the water; or may be deployed on an airplane, a balloon, or a satellite in the air. Application scenarios of the network device and the UE are not limited in the embodiments of this application.

The embodiments of this application may be applied to downlink signal transmission, uplink signal transmission, and device-to-device (D2D) signal transmission. For the downlink signal transmission, a sending device is a network device, and a corresponding receiving device is UE. For the uplink signal transmission, a sending device is UE, and a corresponding receiving device is a network device. For the D2D signal transmission, a sending device is UE, and a corresponding receiving device is also UE. A signal transmission direction is not limited in the embodiments of this application.

Communication between a network device and UE and communication between UEs may be performed by using a licensed spectrum, or may be performed by using an unlicensed spectrum, or may be performed by using both a licensed spectrum and an unlicensed spectrum. The communication between the network device and the UE and the communication between the UEs may be performed by using a spectrum below 6 gigahertz (GHz), or may be performed by using a spectrum above 6 GHz, or may be performed by using both a spectrum below 6 GHz and a spectrum above 6 GHz. Spectrum resources used between the network device and the UE are not limited in the embodiments of this application.

The communications system shown in FIG. 1 may be an LTE communications system or an LTE evolved system, or may be another future communications system (for example, a 5G communications system). Taking the LTE communications system as an example, a system bandwidth supported by the LTE communications system (a bandwidth supported by one carrier) and a quantity of RBs included in the system bandwidth in frequency domain may be shown in the following Table 1:

TABLE 1

| System bandwidth | Quantity of RBs |
| --- | --- |
| 1.4 MHz | 6 |
| 3 MHz | 15 |
| 5 MHz | 25 |
| 10 MHz | 50 |
| 15 MHz | 75 |
| 20 MHz | 100 |

A size of an RB described above is related to a subcarrier spacing. Taking a subcarrier spacing of 15 kHz as an example, one RB may include 12 subcarriers in frequency domain, and may occupy one slot in time domain. It should be noted that the RB in the embodiments of this application may be a physical resource block (PRB) or a virtual resource block (VRB).

In the LTE communications system, one narrowband may include six consecutive RBs in frequency domain. Therefore, the system bandwidth may be divided into several narrowbands based on a narrowband size. One resource block group (RBG) may include P consecutive RBs. Therefore, the system bandwidth may be divided into several RBGs based on an RBG size P. A value of P may be determined based on a quantity of RBs included in the system bandwidth. A correspondence between the RBG size P and the quantity of RBs included in the system bandwidth may be shown in the following Table 2:

TABLE 2

| Quantity of RBs included in the system bandwidth | RBG size P |
| --- | --- |
| 1 to 10 | 1 |
| 11 to 26 | 2 |
| 27 to 63 | 3 |
| 64 to 110 | 4 |

For example, if a downlink system bandwidth includes $N_{RB}^{DL}$ RBs, the downlink system bandwidth may be divided into $N_{NB}^{DL}$ narrowbands and $N_{RBG}$ RBGs, where $N_{NB}^{DL}$ is equal to $$\left\lfloor \frac{N_{RB}^{DL}}{6} \right\rfloor,$$

$N_{RBG}$ is equal to $$\left\lceil \frac{N_{RB}^{DL}}{P} \right\rceil,$$

$\lfloor \ \rfloor$ represents a round-down operation, and $\lceil \ \rceil$ represents a round-up operation. It should be noted that if the quantity of RBs included in the system bandwidth cannot be exactly divided by P, a quantity of RBs included in the last RBG in the system bandwidth may be less than P.

In frequency domain, the RBs included in the downlink system bandwidth are numbered in ascending order of subcarrier indexes, to obtain RBs numbered $0, 1, \ldots, N_{RB}^{DL}-2$, and $N_{RB}^{DL}-1$. Correspondingly, the narrowbands included in the downlink system bandwidth are numbered in ascending order of RB numbers, to obtain narrowbands whose narrowband indexes $n_{NB}$ are $0, 1, \ldots, N_{NB}^{DL}-2$, and $N_{NB}^{DL}-1$. The RBGs included in the downlink system bandwidth are numbered in ascending order of RB numbers, to obtain RBGs whose RBG indexes are $0, 1, \ldots, N_{RBG}-2$, and $N_{RBG}-1$. A manner of dividing an uplink system bandwidth into narrowbands and a manner of numbering the narrowbands are the same as those used for the downlink system bandwidth, and a manner of dividing the uplink system bandwidth into RBGs and a manner of numbering the RBGs are the same as those used for the downlink system bandwidth. Details are not described herein again.

Figure 2:
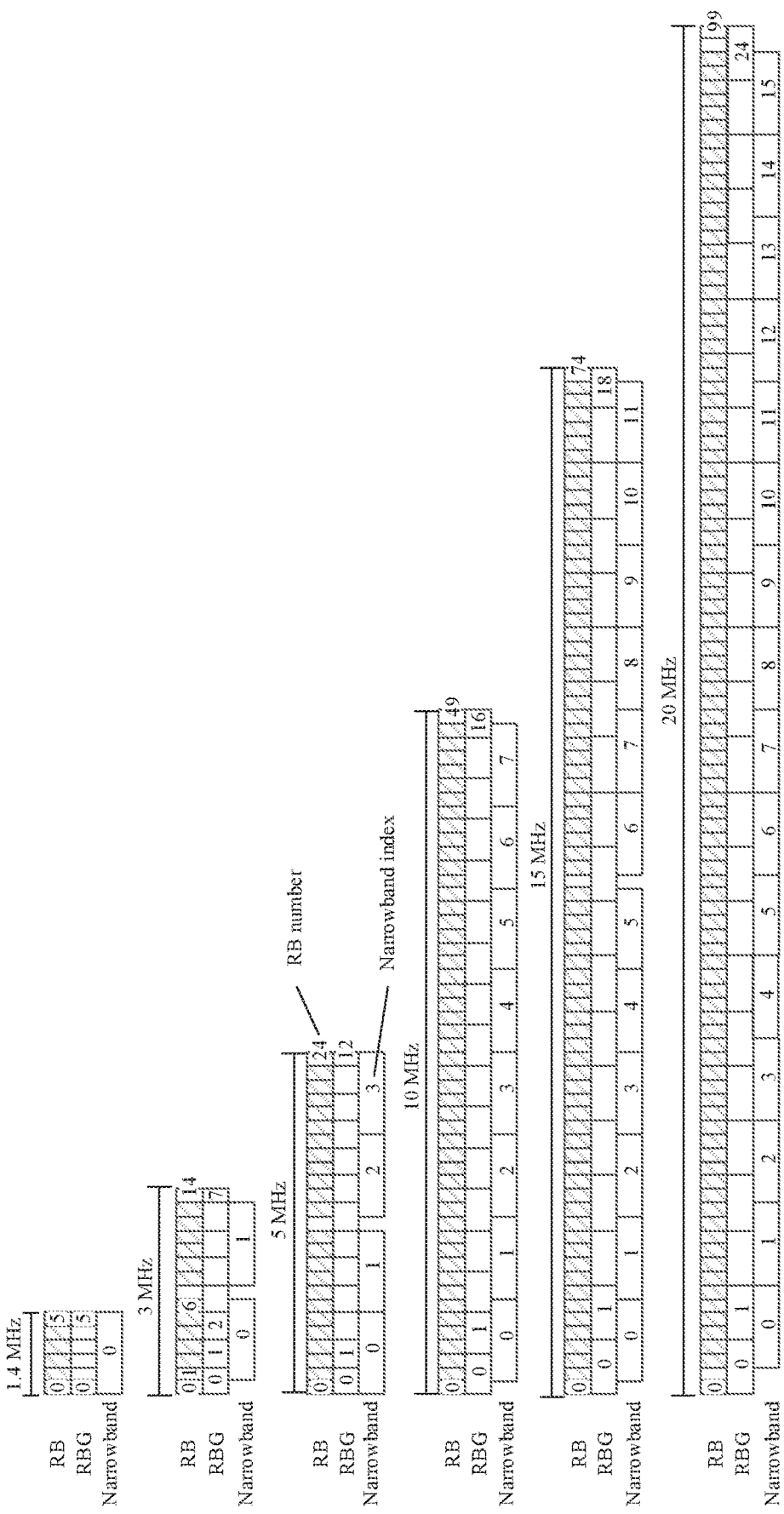
FIG. 2 is a schematic diagram of an RB, an RBG, and a narrowband included in a system bandwidth.

FIG. 2 is a schematic diagram of an RB, an RBG, and a narrowband included in a system bandwidth. In the LTE communications system, narrowband division and RBG division in the system bandwidth may be shown in FIG. 2. An RB filled with slashes in FIG. 2 indicates that the RB is an RB included in a narrowband. For example, for a system bandwidth of 3 MHz, a narrowband whose narrowband index is 0 includes RBs numbered 1 to 6.

In the LTE communications system, uplink data is carried on a physical uplink shared channel (PUSCH), downlink data is carried on a physical downlink shared channel (PDSCH), and the network device may indicate, by using downlink control information (DCI), resources allocated to the PUSCH or the PDSCH.

The UE shown in FIG. 1 may be UE that performs an MTC service, for example, BL UE or CE UE. Taking the BL UE or the CE UE (BL/CE UE) as an example, the BL/CE UE may work in a coverage enhancement mode A (CE mode A), and a maximum transmit bandwidth and a maximum receive bandwidth that can be supported are 1.4 MHz, which is the same as a bandwidth of one narrowband. Therefore, for the BL/CE UE working in the CE mode A, the network device may allocate one RB, or two, three, four, five or six consecutive RBs in one narrowband to a PUSCH of the BL/CE UE by using an uplink resource allocation type 0, and indicate, by using DCI in format 6-0A, resources allocated to the PUSCH of the BL/CE UE. Optionally, DCI sent to the BL/CE UE may be carried, for example, on a machine type communication physical downlink control channel (MTC physical downlink control channel, MPDCCH).

The following describes a field used for resource block allocation (RB allocation field) in the DCI in format 6-0A.

The RB allocation field includes $$\left\lceil \log_2 \left\lfloor \frac{N_{RB}^{UL}}{6} \right\rfloor \right\rceil + 5$$

bits, where $N_{RB}^{UL}$ represents a quantity of RBs included in an uplink system bandwidth. In the bits included in the RB allocation field, if a decimal value corresponding to five low-order bits is less than or equal to 20, it indicates that the RB allocation field may be used to indicate resources allocated by using the uplink resource allocation type 0. In this case, $$\left\lceil \log_2 \left\lfloor \frac{N_{RB}^{UL}}{6} \right\rfloor \right\rceil$$

high-order bits are used to indicate one narrowband allocated to the PUSCH of the BL/CE UE in the uplink system bandwidth, and the five low-order bits are used to indicate one RB or a plurality of consecutive RBs allocated to the PUSCH of the BL/CE UE in the narrowband. In this scenario, a bandwidth of frequency domain resources allocated by using the RB allocation field is less than or equal to 1.4 MHz.

It should be noted that, for the DCI in format 6-0A, when a decimal value corresponding to the five low-order bits in the RB allocation field is greater than 20, the RB allocation field is used to indicate resource block groups allocated by using an uplink resource allocation type 4. A quantity of resource block groups allocated by using the uplink resource allocation type 4 is greater than 2 and less than or equal to 8, and each resource block group includes three consecutive PRBs. A bandwidth occupied by the resource block groups allocated by using the uplink resource allocation type 4 is less than or equal to 5 MHz. Therefore, for the BL/CE UE that can support the maximum transmit bandwidth of 1.4 MHz, in the DCI in format 6-0A, a decimal value that is corresponding to the five low-order bits and that is greater than 20 is an unused value.

Correspondingly, for the BL/CE UE working in the CE mode A, the network device may allocate one RB, or two, three, four, five or six consecutive RBs in one narrowband to a PDSCH of the BL/CE UE by using a downlink resource allocation type 2, and indicate, by using DCI in format 6-1A, resources allocated to the PDSCH of the BL/CE UE. Optionally, the DCI may be carried on, for example, an MPDCCH.

The following describes a field used for resource block allocation (RB allocation field) in the DCI in format 6-1A.

The RB allocation field includes $$\left\lceil \log_2 \left\lfloor \frac{N_{RB}^{DL}}{6} \right\rfloor \right\rceil + 5$$

bits, where $N_{RB}^{DL}$ represents a quantity of RBs included in a downlink system bandwidth. In the bits included in the RB allocation field, if a decimal value corresponding to five low-order bits is less than or equal to 20, it indicates that the RB allocation field is used to indicate resources allocated by using the downlink resource allocation type 2. In this case, $$\left\lceil \log_2 \left\lfloor \frac{N_{RB}^{DL}}{6} \right\rfloor \right\rceil$$

high-order bits are used to indicate one narrowband allocated to the PDSCH of the BL/CE UE in the downlink system bandwidth, and the five low-order bits are used to indicate one RB or a plurality of consecutive RBs allocated to the PDSCH of the BL/CE UE in the narrowband. In this scenario, a bandwidth of frequency domain resources allocated by using the RB allocation field is less than or equal to 1.4 MHz. Correspondingly, for the BL/CE UE that can support the maximum transmit bandwidth of 1.4 MHz, in the DCI in format 6-1A, a decimal value that is corresponding to the five low-order bits and that is greater than 20 is an unused value.

In the LTE communications system, due to suddenness of a mobile broadband service, it is highly likely that only one conventional UE exists in some subframes. The conventional UE herein is UE other than the BL UE and the CE UE. Currently, most network devices allocate resources to a PDSCH of the conventional UE by using a downlink resource allocation type 0, and allocate resources to a PUSCH of the conventional UE by using the uplink resource allocation type 0.

When the network device allocates the resources to the PDSCH of the conventional UE by using the downlink resource allocation type 0, a field used for resource block allocation in DC indicates, through bit mapping, one or more RBGs allocated to the PDSCH of the conventional UE. A quantity of RBs included in the RBG is that shown in Table 2. Each bit included in the field used for resource block allocation corresponds to one RBG. When an RBG is allocated to the PDSCH of the conventional UE, a value of a bit corresponding to the RBG is 1. When an RBG is not allocated to the PDSCH of the conventional UE, a value of a bit corresponding to the RBG is 0.

Figure 3:
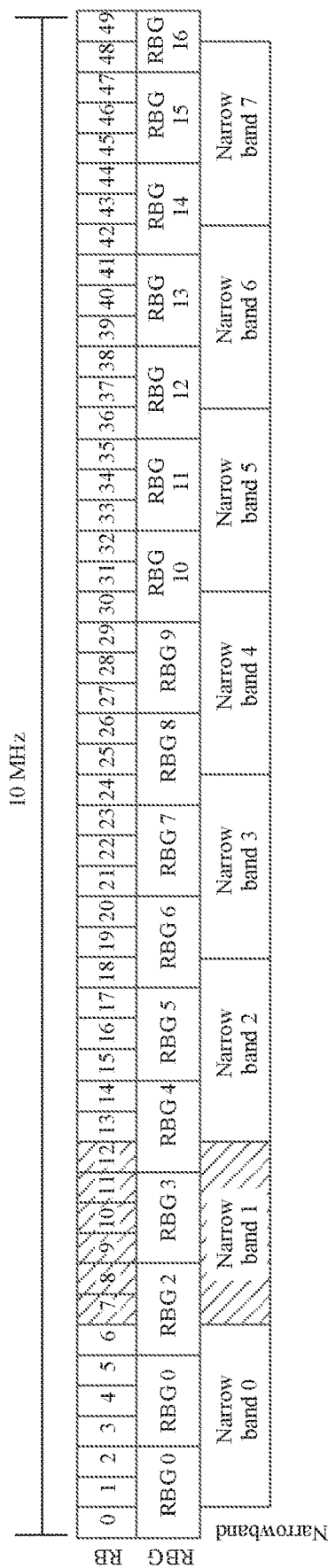
FIG. 3 is a schematic diagram of a resource allocation manner.

It can be learned from FIG. 2 that, in the system bandwidth, in existing narrowband and RBG division manners, a boundary of a narrowband may not be aligned with a boundary of an RBG. Therefore, in one subframe, when both PDSCH resources need to be allocated to the conventional UE by using the downlink resource allocation type 0 and PDSCH resources need to be allocated to the BL/CE UE, some RBs probably cannot be allocated to the conventional UE, resulting in resource fragmentation. Consequently, the conventional UE cannot effectively use remaining resources in the system bandwidth, and a throughput of the conventional UE cannot be maximized. FIG. 3 is a schematic diagram of a resource allocation manner. As shown in FIG. 3, taking a system bandwidth of 10 MHz as an example, in an existing manner of allocating one RB or a plurality of consecutive RBs in one narrowband to the BL/CE UE, the network device allocates all RBs in a narrowband whose narrowband index is 1 to the PDSCH of the BL/CE UE, that is, allocates RBs numbered 7 to 12 to the PDSCH of the BL/CE UE. In this scenario, even if there are idle RBs (RBs numbered 6, 13, and 14) in RBGs numbered 2 and 4, these RBs cannot be allocated to the conventional UE. Consequently, the conventional UE cannot effectively use remaining resources in the system bandwidth.

Figure 4:
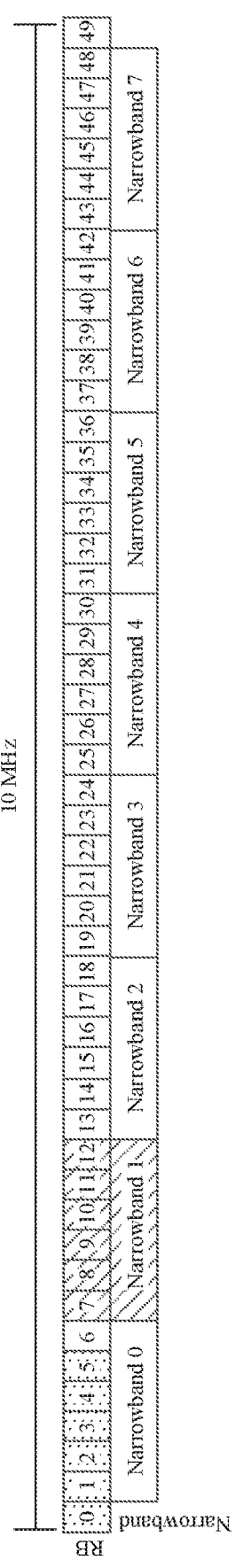
FIG. 4 is a schematic diagram of another resource allocation manner.

Correspondingly, when allocating resources to the PUSCH of the conventional UE by using the uplink resource allocation type 0, the network device needs to allocate consecutive RBs to the PUSCH of the conventional UE. However, when an uplink RB in a narrowband is allocated to the BL/CE in one subframe in an existing narrowband division manner, uplink resources may be fragmented, and remaining RBs are no longer consecutive. Consequently, the conventional UE cannot use the remaining RBs to a maximum extent, and a throughput cannot be maximized. FIG. 4 is a schematic diagram of another resource allocation manner. As shown in FIG. 4, still taking a system bandwidth of 10 MHz as an example, in an existing manner of allocating one RB or a plurality of consecutive RBs in one narrowband to the BL/CE UE, the network device allocates all RBs in a narrowband whose narrowband index is 1 to the PUSCH of the BL/CE UE, that is, allocates RBs numbered 7 to 12 to the PUSCH of the BL/CE UE. Because RBs numbered 0 to 5 are resources used by a physical random access channel (PRACH), an RB numbered 6 is not consecutive with RBs numbered 13 to 49. In this scenario, even if the network device needs to allocate resources to the conventional UE, the network device cannot allocate the RB numbered 6 to the conventional UE. Consequently, the conventional UE cannot effectively use remaining resources in the system bandwidth.

In other words, when resources are allocated to the BL/CE UE that can support the maximum transmit bandwidth of 1.4 MHz and the maximum receive bandwidth of 1.4 MHz in the existing manner, because resources only in a narrowband can be allocated to the BL/CE UE, resources in the system bandwidth cannot be flexibly allocated to the BL/CE UE, thereby resulting in relatively low resource utilization in the system bandwidth.

In consideration of the foregoing problem, the embodiments of this application provide a data transmission method to allocate resources outside a narrowband to the BL/CE UE that can support the maximum transmit bandwidth of 1.4 MHz and the maximum receive bandwidth of 1.4 MHz. In this way, a quantity of fragmented resources that cannot be used by the conventional UE in remaining resources in the system bandwidth is reduced, so that the remaining resources can be used by other conventional UE to a maximum extent, thereby improving system resource utilization. The method in the embodiments of this application may be applied to a scenario in which the network device communicates with the BL/CE UE. The method in the embodiments of this application may be further applied to a scenario in which two UEs perform D2D communication. One UE is BL/CE UE, and the BL/CE UE may receive resources allocated by the other UE to the BL/CE UE by using DCI. For example, in a scenario in which UE 5 communicates with UE 4 and/or UE 6 in FIG. 1, the UE 4 and/or the UE 6 may allocate resources to BL/CE UE, and the UE 5 may allocate resources to the UE 4 and/or the UE 6 by using DCI.

The method provided in the embodiments of this application is described below by using an example in which the method is applied to a scenario in which a network device communicates with BL/CE UE. In this scenario, the method may be performed by the network device and the BL/CE UE, or may be performed by a chip in the network device and a chip in the BL/CE UE. The following uses an example in which the method is performed by the network device and the BL/CE UE to describe the technical solutions of this application in detail by using some embodiments. The following several embodiments may be combined with each other, and a same or similar concept or process may not be described repeatedly in some embodiments.

Figure 5:
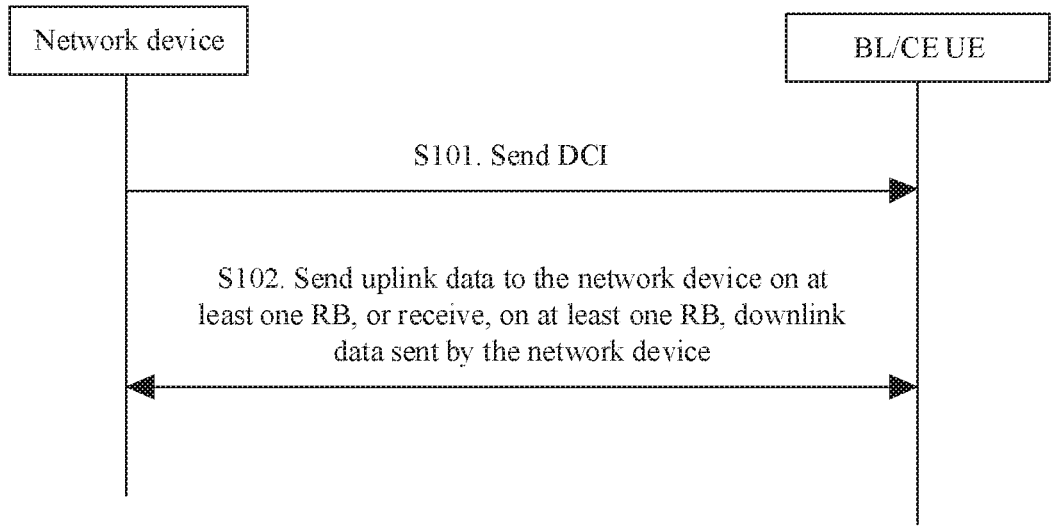
FIG. 5 is a signaling flowchart of a data transmission method according to an embodiment of this application.

FIG. 5 is a signaling flowchart of a data transmission method according to an embodiment of this application. As shown in FIG. 5, the method may include the following steps.

S101. A network device sends DCI to BL/CE UE.

The DCI includes a first bit and a second bit, when a value of the second bit is a value in a first set, a value of the first bit is used to indicate a narrowband allocated by the network device to the BL/CE UE, the value of the second bit is used to indicate at least one RB allocated by the network device to the BL/CE UE, a quantity of the at least one RB is less than or equal to a quantity of RBs included in the narrowband, and there is an RB that does not belong to the narrowband in the at least one RB. The second bit is M bits, the first set includes N values, N is a positive integer less than $2^M$, and M is a positive integer.

Correspondingly, the BL/CE UE receives the DCI.

It should be noted that the at least one RB indicated by the value of the second bit may be a PRB or a VRB. The VRB may be a centralized VRB. A centralized VRB numbered $n_{VRB}$ corresponds to a PRB numbered $n_{PRB}$.

S102. The BL/CE UE sends uplink data to the network device on the at least one RB, or the BL/CE UE receives, on the at least one RB, downlink data sent by the network device.

Specifically, when allocating frequency domain resources whose bandwidth is less than or equal to 1.4 MHz to the BL/CE UE, the network device may allocate at least one RB that does not belong to the narrowband to the BL/CE UE, and indicate, by using the value of the second bit in the DCI, a specific RB allocated to the BL/CE UE. In other words, the network device may allocate, to the BL/CE UE, an RB that does not belong to the narrowband indicated by the first bit. The RB that does not belong to the narrowband may be, for example, an RB that causes resource fragmentation in the prior art. In this manner, the network device can more flexibly allocate resources to the BL/CE UE. In this way, when the network device allocates resources to the BL/CE UE in one subframe, a quantity of fragmented resources that cannot be used by conventional UE in remaining resources in a system bandwidth can be reduced, so that the remaining resources can be used by other conventional UE to a maximum extent, thereby improving system resource utilization.

It can be understood that, for example, if the network device allocates one RB to the BL/CE UE, the RB may be an RB that does not belong to the narrowband indicated by the first bit. For example, if the network device allocates at least two RBs to the BL/CE UE, one of the at least two RBs may not belong to the narrowband indicated by the first bit, or a part of the RBs may not belong to the narrowband indicated by the first bit, or all RBs may not belong to the narrowband indicated by the first bit.

For example, still refer to the example shown in FIG. 3. Taking a system bandwidth of 10 MHz as an example, when resources of a narrowband whose narrowband index is 1 are allocated to the BL/CE UE by using an existing method, RBs numbered 6, 13, and 14 are RBs that cause resource fragmentation and cannot be allocated to the conventional UE. However, when the method in this embodiment of this application is used, the network device may allocate RBs numbered 6 to 11 to the BL/CE UE when allocating resources to the BL/CE UE. In this case, the RB numbered 6 is not an RB in the narrowband corresponding to the narrowband index 1. In this scenario, because an RB allocated by the network device to the BL/CE UE is aligned with a boundary of an RBG, the RBs numbered 13 and 14 can be allocated to the conventional UE, thereby improving resource utilization in the system bandwidth.

For another example, still refer to the example shown in FIG. 4. Taking a system bandwidth of 10 MHz as an example, when resources of a narrowband whose narrowband index is 1 are allocated to the BL/CE UE by using an existing method, an RB numbered 6 is an RB that causes resource fragmentation. However, when the method in this embodiment of this application is used, the network device may allocate RBs numbered 6 to 11 to the BL/CE UE when allocating resources to the BL/CE UE. In this case, the RB numbered 6 is not an RB in the narrowband corresponding to the narrowband index 1. In this scenario, remaining RBs in the system bandwidth other than the RBs allocated to the BL/CE UE and RBs used by a PRACH are consecutive RBs, and there is no resource fragmentation. Therefore, all the remaining RBs can be allocated to the conventional UE, thereby improving resource utilization in the system bandwidth.

In this embodiment, when the network device indicates resources of a PUSCH of the BL/CE UE by using DCI, the DCI may be DC in format 6-0A. In this scenario, the first bit may be, for example, $$\left\lceil \log_2 \left\lfloor \frac{N_{RB}^{UL}}{6} \right\rfloor \right\rceil$$

bits, and the second bit may be, for example, five bits. In other words, M is equal to 5. When the network device indicates resources of a PDSCH of the BL/CE UE by using DCI, the DCI may be DCI in format 6-1A. In this scenario, the first bit may be, for example, $$\left\lceil \log_2 \left\lfloor \frac{N_{RB}^{DL}}{6} \right\rfloor \right\rceil$$

bits, and the second bit may be, for example, five low-order bits. In other words, M is equal to 5. The second bit may be, for example, five low-order bits in a resource allocation field in the DCI.

When the second bit includes five bits, the second bit corresponds to a total of 32 decimal values. In the prior art, when a decimal value corresponding to the second bit is greater than 20 and less than or equal to 31, the value of the second bit is an unused value. In this embodiment, one or more of the 11 unused values are used to indicate the at least one RB in this embodiment of this application. In other words, each of the N values included in the first set is greater than 20 and less than or equal to 31. In this manner, allocated resources can be flexibly indicated to the BL/CE UE, thereby avoiding an increase in bit overheads of the DCI.

It should be noted that, when a decimal value corresponding to the second bit is not greater than 20, the second bit is used to indicate one or more RBs in the narrowband indicated by the first bit. The second bit indicates an allocated resource block for the PUSCH by using an uplink resource allocation type 0, or indicates an allocated resource block for the PDSCH by using a downlink resource allocation type 2. In this case, a manner in which the second bit indicates an allocated resource block is the same as an existing manner in which five low-order bits in a resource block allocation field included in a DCI format 6-0A or 6-1A indicate an allocated resource block.

The at least one RB specifically indicated by the value of the second bit in the DCI is described below by using an example in which numbers of RBs included in the narrowband are n, n+1, n+2, n+3, n+4, and n+5. Specifically, the following two manners may be included:

Manner 1: The network device indicates, by using the value of the second bit, a start RB in the at least one RB and a quantity of consecutive RBs included in the at least one RB.

It is assumed that a smallest number of an RB in the at least one RB is s, and a largest number of an RB in the at least one RB is t. In this scenario, the RB numbered s is a resource block with a smallest number in an RBG (an edge RB in the RBG), and s is a maximum value less than n, or the RB numbered t is an RB with a largest number in an RBG (an edge RB in the RBG), and t is a minimum value greater than n+5. In other words, at least one side of the at least one RB indicated by the value of the second bit is aligned with a boundary of the RBG. In RBs included in the RBG, at least one RB is an RB outside the narrowband indicated by the value of the first bit in the DCI, and the RBG is an RBG closest to the narrowband. In this manner, when the network device allocates resources to the BL/CE UE, a quantity of resource fragments in the system bandwidth can be reduced as much as possible by aligning the allocated at least one resource block with the boundary of the RBG, thereby improving resource utilization in the system bandwidth.

For example, N is less than or equal to 9, that is, the second bit has a maximum of nine values. For example, a correspondence between the value of the second bit, the smallest number of the RB in the at least one RB, and the quantity of consecutive RBs included in the at least one RB may be that shown in one or more items in the following Table 3. For example, the correspondence is that shown in all nine items in the following Table 3, and N is equal to 9. Any one of the items includes a value of the second bit, a smallest number of an RB in at least one RB, and a quantity of consecutive RBs included in the at least one RB.

TABLE 3

| Value of the second bit | Smallest number of an RB in at least one RB | Quantity of consecutive RBs included in the at least one RB |
| --- | --- | --- |
| Value of the second bit | s | 9 |
| Value of the second bit | s | 3 |
| Value of the second bit | s | 4 |
| Value of the second bit | s | 5 |
| Value of the second bit | s or t-5 | 6 |
| Value of the second bit | t-4 | 5 |
| Value of the second bit | t-3 | 4 |
| Value of the second bit | t-2 | 3 |
| Value of the second bit | t-1 | 2 |

For example, N is less than or equal to 10, that is, the second bit has a maximum of ten values. For example, a correspondence between the value of the second bit, the smallest number of the RB in the at least one RB, and the quantity of consecutive RBs included in the at least one RB may be that shown in one or more items in the following Table 4. For example, the correspondence is that shown in all ten items in the following Table 4, and N is equal to 10. Any one of the items includes a value of the second bit, a smallest number of an RB in at least one RB, and a quantity of consecutive RBs included in the at least one RB.

TABLE 4

| Value of the second bit | Smallest number of an RB in at least one RB | Quantity of consecutive RBs included in the at least one RB |
| --- | --- | --- |
| Value of the second bit | s | 2 |
| Value of the second bit | s | 3 |
| Value of the second bit | s | 4 |
| Value of the second bit | s | 5 |
| Value of the second bit | s | 6 |
| Value of the second bit | t-5 | 6 |
| Value of the second bit | t-4 | 5 |
| Value of the second bit | t-3 | 4 |
| Value of the second bit | t-2 | 3 |
| Value of the second bit | t-1 | 2 |

For example, N is less than or equal to 11, that is, the second bit has a maximum of eleven values. For example, a correspondence between the value of the second bit, the smallest number of the RB in the at least one RB, and the quantity of consecutive RBs included in the at least one RB may be that shown in one or more items in the following Table 5. For example, the correspondence is that shown in all eleven items in the following Table 5, and N is equal to 11. Any one of the items includes a value of the second bit, a smallest number of an RB in at least one RB, and a quantity of consecutive RBs included in the at least one RB.

TABLE 5

| Value of the second bit | Smallest number of an RB in at least one RB | Quantity of consecutive RBs included in the at least one RB |
|---|---|---|
| Value of the second bit | s | 1 |
| Value of the second bit | s | 2 |
| Value of the second bit | s | 3 |
| Value of the second bit | s | 4 |
| Value of the second bit | s | 5 |
| Value of the second bit | s or t-5 | 6 |
| Value of the second bit | t-4 | 5 |
| Value of the second bit | t-3 | 4 |
| Value of the second bit | t-2 | 3 |
| Value of the second bit | t-1 | 2 |
| Value of the second bit | t | 1 |

It can be understood that the tables shown in Table 3 to Table 5 may be applied to any system bandwidth.

Manner 2: The network device indicates the at least one RB by using a correspondence between the value of the second bit and the at least one RB.

For example, when numbers of RBs included in the narrowband are n, n+1, n+2, n+3, n+4, and n+5, there may be the following nine correspondences between the value of the second bit and the at least one RB indicated by the value. Details are as follows:

A first correspondence is that shown in one or more items in a first correspondence table, and any one of the items includes a value of the second bit and at least one RB corresponding to the value of the second bit:

| First correspondence table | |
|---|---|
| Value of the second bit | At least one RB |
| Value of the second bit | RBs numbered n − 1 and n |
| Value of the second bit | RBs numbered n − 1, n, and n + 1 |
| Value of the second bit | RBs numbered n − 1, n, n + 1, and n + 2 |
| Value of the second bit | RBs numbered n − 1, n, n + 1, n + 2, and n + 3 |
| Value of the second bit | RBs numbered n − 1, n, n + 1, n + 2, n + 3, and n + 4 or RBs numbered n + 1, n + 2, n + 3, n + 4, n + 5, and n + 6 |
| Value of the second bit | RBs numbered n + 2, n + 3, n + 4, n + 5, and n + 6 |
| Value of the second bit | RBs numbered n + 3, n + 4, n + 5, and n + 6 |
| Value of the second bit | RBs numbered n + 4, n + 5, and n + 6 |
| Value of the second bit | RBs numbered n + 5 and n + 6 |

A second correspondence is that show in one or more items in a second correspondence table, and any one of the items includes a value of the second bit and at least one RB corresponding to the value of the second bit

| Second correspondence table | |
|---|---|
| Value of the second bit | At least one RB |
| Value of the second bit | RB numbered n − 1 or RB numbered n − 2 |
| Value of the second bit | RBs numbered n − 2 and n − 1 |
| Value of the second bit | RBs numbered n − 1, n, and n + 1 or RBs numbered n − 2, n − 1, and n |
| Value of the second bit | RBs numbered n − 2, n − 1, n, and n + 1 |
| Value of the second bit | RBs numbered n − 1, n, n + 1, n + 2, and n + 3 or RBs numbered n − 2, n − 1, n, n + 1, and n + 2 |
| Value of the second bit | RBs numbered n − 2, n − 1, n, n + 1, n + 2, and n + 3 |
| Value of the second bit | RBs numbered n + 2, n + 3, n + 4, n + 5, and n + 6 |

| Second correspondence table | |
|---|---|
| Value of the second bit | RBs numbered n + 4, n + 5, and n + 6 |
| Value of the second bit | At least one RB |
| Value of the second bit | RB numbered n − 6 |

A third correspondence is that shown in one or more items in the following third correspondence table, and any one of the items includes a value of the second bit and at least one RB corresponding to the value of the second bit.

| Third correspondence table | |
|---|---|
| Value of the second bit | At least one RB |
| Value of the second bit | RBs numbered n − 1 and n |
| Value of the second bit | RBs numbered n − 1, n, and n + 1 |
| Value of the second bit | RBs numbered n − 1, n, n + 1, and n + 2 |
| Value of the second bit | RBs numbered n − 1, n, n + 1, n + 2, and n + 3 |
| Value of the second bit | RBs numbered n − 1, n, n + 1, n + 2, n + 3, and n + 4 or RBs numbered n + 2, n + 3, n + 4, n + 5, n + 6, and n + 7 |
| Value of the second bit | RBs numbered n + 3, n + 4, n + 5, n + 6, and n + 7 |
| Value of the second bit | RBs numbered n + 4, n + 5, n + 6, and n + 7 |
| Value of the second bit | RBs numbered n + 5, n + 6, and n + 7 |
| Value of the second bit | RBs numbered n + 6 and n + 7 |

A fourth correspondence is that shown in one or more items in a fourth correspondence table, and an one of the items includes a value of the second bit and at least one RB corresponding to the value of the second bit:

| Fourth correspondence table | |
|---|---|
| Value of the second bit | At least one RB |
| Value of the second bit | RBs numbered n − 1 and n |
| Value of the second bit | RBs numbered n − 1, n, and n + 1 |
| Value of the second bit | RBs numbered n − 1, n, n + 1, and n + 2 |
| Value of the second bit | At least one RB |
| Value of the second bit | RBs numbered n − 1, n, n + 1, n + 2, and n + 3 |
| Value of the second bit | RBs numbered n − 1, n, n + 1, n + 2, n + 3, and n + 4 |
| Value of the second bit | RBs numbered n + 2, n + 3, n + 4, n + 5, and n + 6 |
| Value of the second bit | RBs numbered n + 3, n + 4, n + 5, and n + 6 |
| Value of the second bit | RBs numbered n + 5 and n + 6 |
| Value of the second bit | RB numbered n + 6 |

A fifth correspondence is that shown in one or more items in a fifth correspondence table, and any one of the items includes a value of the second bit and at least one RB corresponding to the value of the second bit:

| Fifth correspondence table | |
|---|---|
| Value of the second bit | At least one RB |
| Value of the second bit | RBs numbered n − 3 and n − 2 |
| Value of the second bit | RBs numbered n − 3, n − 2, and n − 1 |
| Value of the second bit | RBs numbered n − 3, n − 2, n − 1, and n |
| Value of the second bit | RBs numbered n − 3, n − 2, n − 1, n, and n + 1 |
| Value of the second bit | RBs numbered n − 1, n, n + 1, n + 2, n + 3, and n + 4 or RBs numbered n + 1, n + 2, n + 3, n + 4, n + 5, and n + 6 |
| Value of the second bit | RBs numbered n + 4, n + 5, n + 6, n + 7, and n + 8 |
| Value of the second bit | RBs numbered n + 5, n + 6, n + 7, and n + 8 |
| Value of the second bit | RBs numbered n + 6, n + 7, and n + 8 |
| Value of the second bit | RBs numbered n + 7 and n + 8 |

A sixth correspondence is that shown in one or more items in the following sixth correspondence table, and any one of the items includes a value of the second bit and at least one RB corresponding to the value of the second bit:

| Sixth correspondence table | |
|---|---|
| Value of the second bit | At least one RB |
| Value of the second bit | RBs numbered n − 2 and n − 1 |
| Value of the second bit | RBs numbered n − 2, n − 1, and n |
| Value of the second bit | RBs numbered n − 2, n − 1, n, and n + 1 |
| Value of the second bit | RBs numbered n − 2, n − 1, n, n + 1, and n + 2 |
| Value of the second bit | RBs numbered n − 2, n − 1, n, n + 1, n + 2, and n + 3 |

A seventh correspondence is that shown in one or more items in the following seventh correspondence table, and any one of the items includes a value of the second bit and at least one RB corresponding to the value of the second bit:

| Seventh correspondence table | |
|---|---|
| Value of the second bit | At least one RB |
| Value of the second bit | RBs numbered n + 2, n + 3, n + 4, n + 5, n + 6, and n + 7 |
| Value of the second bit | RBs numbered n + 3, n + 4, n + 5, n + 6, and n + 7 |
| Value of the second bit | RBs numbered n + 4, n + 5, n + 6, and n + 7 |
| Value of the second bit | RBs numbered n + 5, n + 6, and n + 7 |
| Value of the second bit | RBs numbered n + 6 and n + 7 |

An eighth correspondence is that shown in one or more items in the following eighth correspondence table, and any one of the items includes a value of the second bit and at least one RB corresponding to the value of the second bit:

| Eighth correspondence table | |
|---|---|
| Value of the second bit | At least one RB |
| Value of the second bit | RBs numbered n + 1, n + 2, n + 3, n + 4, n + 5, and n + 6 |
| Value of the second bit | RBs numbered n + 2, n + 3, n + 4, n + 5, and n + 6 |
| Value of the second bit | At least one RB |
| Value of the second bit | RBs numbered n + 3, n + 4, n + 5, and n + 6 |
| Value of the second bit | RBs numbered n + 4, n + 5, and n + 6 |
| Value of the second bit | RBs numbered n + 5 and n + 6 |

A ninth correspondence is that shown in one or more items in the following ninth correspondence table, and any one of the items includes a value of the second bit and at least one RB corresponding to the value of the second bit:

| Ninth correspondence table | |
|---|---|
| Value of the second bit | At least one RB |
| Value of the second bit | RBs numbered n + 1 and n |
| Value of the second bit | RBs numbered n + 1, n, and n + 1 |
| Value of the second bit | RBs numbered n + 1, n, n + 1, and n + 2 |
| Value of the second bit | RBs numbered n + 1, n, n + 1, n + 2, and n + 3 |
| Value of the second bit | RBs numbered n + 1, n, n + 1, n + 2, n + 3, and n + 4 |

It should be specially noted that the foregoing first to the ninth correspondence tables are merely examples for understanding the solution in this embodiment of this application. The foregoing first to the ninth correspondences are not limited to the foregoing table form, and may be in another correspondence form. This is not specifically limited in this embodiment of this application. All representation forms that can reflect any one of the first to the ninth correspondences shall fall within the scope of this embodiment of this application.

Optionally, for different system bandwidths and different narrowband indexes, the correspondence between the value of the second bit and the at least one RB indicated by the value may be that shown in one or more items in the following Table 6, and any one of the items includes a system bandwidth, a narrowband index, and a correspondence between a value of the second bit and at least one RB indicated by the value. The narrowband index is a narrowband index of the narrowband indicated by the value of the first bit.

TABLE 6

| System bandwidth | Narrowband index | Correspondence between the value of the second bit and the at least one RB indicated by the value |
|---|---|---|
| 3 MHz | 0 | First correspondence |
| 5 MHz | 2 and/or 3 | First correspondence |
| 10 MHz | 0, 1, 2, 3, 4, 5, and/or 6 | Third correspondence |
| | 7 | First correspondence |
| 15 MHz | 0, 2 and/or 4 | First correspondence |
| | 1,3, and/or 5 | Fifth correspondence |
| | 6, 8, and/or 10 | Sixth correspondence |
| | 7 and/or 9 | Third correspondence |
| | 11 | First correspondence or eighth correspondence |
| 20 MHz | 0, 2, 4, 6, 8, 10, 12, and/or 14 | Sixth correspondence |
| | 1, 3, 5, 7, 9, 11, 13, and/or 15 | Third correspondence |

For the correspondences in Table 6, when a system bandwidth and a narrowband index are given, if the correspondence between the value of the second bit and the at least one RB indicated by the value meets a correspondence corresponding to the system bandwidth and the narrowband index, the value of the second bit may indicate the at least one RB, and an RB with a smallest number or a largest number in the at least one RB is aligned with a boundary of an RBG. In RBs included in the RBG, at least one RB is an RB outside the narrowband indicated by the value of the first bit in the DCI, and the RBG is an RBG closest to the narrowband. Therefore, when the network device allocates the at least one RB to the BL/CE UE by using the value of the second bit, a quantity of resource fragments can be reduced as much as possible, so that remaining resources can be used by the conventional UE to a maximum extent, thereby improving resource utilization in the system bandwidth.

It should be noted that in this scenario, when a system bandwidth is 3 MHz, if a narrowband index of the narrowband indicated by the value of the first bit is 1, the network device may indicate, by using the second bit, one RB or a plurality of consecutive RBs in the narrowband that are allocated to the BL/CE UE. In this case, the allocated RBs do not include an RB outside the narrowband, and a decimal value corresponding to the second bit is not greater than 20. Correspondingly, when a system bandwidth is 5 MHz, if a narrowband index of the narrowband indicated by the value of the first bit is 0 or 1, the network device may indicate, by using the second bit, one RB or a plurality of consecutive RBs in the narrowband that are allocated to the BL/CE UE.

In this case, the allocated RBs do not include an RB outside the narrowband, and a decimal value corresponding to the second bit is not greater than 20.

Optionally, in some embodiments, for different system bandwidths and different narrowband indexes, the correspondence between the value of the second bit and the at least one RB indicated by the value may be that shown in one or more items in the following Table 7, and any one of the items includes a system bandwidth, a narrowband index, and a correspondence between a value of the second bit and at least one RB indicated by the value. The narrowband index is a narrowband index of the narrowband indicated by the value of the first bit.

TABLE 7

| System bandwidth | Narrowband index | Correspondence between the value of the second bit and the at least one RB indicated by the value |
|---|---|---|
| 3 MHz | 0 | First correspondence |
|  | 1 | Second correspondence |
| 5 MHz | 2 | First correspondence |
|  | 3 | Ninth correspondence |
| 10 MHz | 0, 1, 2, 3, 4, 5, and/or 6 | Third correspondence |
|  | 7 | Fourth correspondence |
| 15 MHz | 0, 2, and/or 4 | First correspondence |
|  | 1, 3, and/or 5 | Fifth correspondence |
|  | 6, 8, and/or 10 | Sixth correspondence |
|  | 7 and/or 9 | Seventh correspondence |
|  | 11 | Eighth correspondence |
| 20 MHz | 0, 2, 4, 6, 8, 10, 12, and/or 14 | Sixth correspondence |
|  | 1, 3, 5, 7, 9, 11, 13, and/or 15 | Seventh correspondence |

In other words, when a system bandwidth and a narrowband index are given, if the correspondence between the value of the second bit and the at least one RB indicated by the value meets a correspondence corresponding to the system bandwidth and the narrowband index, the value of the second bit may indicate the at least one RB, and an RB with a smallest number or a largest number in the at least one RB is aligned with a boundary of an RBG. In RBs included in the RBG, at least one RB is an RB outside the narrowband indicated by the value of the first bit in the DCI, and the RBG is an RBG closest to the narrowband. Therefore, when the network device allocates the at least one RB to the BL/CE UE by using the value of the second bit, a quantity of resource fragments can be reduced as much as possible, so that remaining resources can be used by the conventional UE to a maximum extent, thereby improving resource utilization in the system bandwidth.

For example, still referring to the example shown in FIG. 3 in which a system bandwidth is 10 MHz, if the network device needs to allocate six RBs to the PDSCH of the BL/CE UE, the network device allocates all RBs in one narrowband in the system bandwidth to the PDSCH of the BL/CE UE in an existing manner of allocating resources to the BL/CE UE. It is assumed that the network device allocates all RBs in a narrowband whose narrowband index is 1 to the PDSCH of the BL/CE UE, that is, allocates RBs numbered 7 to 12 to the PDSCH of the BL/CE UE. In this scenario, even if there are idle RBs (RBs numbered 6, 13, and 14) in RBGs numbered 2 and 4, these RBs cannot be allocated to the conventional UE, thereby resulting in relatively low resource utilization in the system bandwidth.

When the manner of this embodiment is used, it may be determined, based on Table 6 or Table 7, that the network device may indicate an allocated resource block to the BL/CE UE by using the value of the second bit based on the third correspondence. That is, the network device may indicate a narrowband whose index is 1 by using the value of the first bit, and allocate RBs numbered 6 to 11 (resource blocks numbered n−1, n, n+1, n+2, n+3, and n+4) to the BL/CE UE. In this case, the RB numbered 6 is not an RB in the narrowband corresponding to the narrowband index 1. Alternatively, the network device may indicate a narrowband whose index is 1 by using the value of the first bit, and allocate RBs numbered 9 to 14 (resource blocks numbered n+2, n+3, n+4, n+5, n+6, and n+7) to the BL/CE UE. In this case, the RBs numbered 13 and 14 are not RBs in the narrowband corresponding to the narrowband index 1. In this scenario, an RB allocated by the network device to the BL/CE UE is aligned with a boundary of an RBG. Therefore, a case in which a remaining RB in an RBG cannot be allocated to the conventional UE because a part of RBs in the RBG are allocated to the BL/CE UE is avoided, to prevent remaining resources in the system bandwidth from being fragmented, so that the remaining resources can be used by the conventional UE to a maximum extent, thereby improving resource utilization in the system bandwidth.

For another example, still referring to the example shown in FIG. 4 in which a system bandwidth is 10 MHz, if the network device needs to allocate six RBs to the PUSCH of the BL/CE UE, the network device allocates all RBs in one narrowband in the system bandwidth to the PDSCH of the BL/CE UE in an existing manner of allocating resources to the BL/CE UE. It is assumed that the network device allocates all RBs in a narrowband whose narrowband index is 1 to the PDSCH of the BL/CE UE, that is, allocates RBs numbered 7 to 12 to the PUSCH of the BL/CE UE. In this scenario, an RB numbered 6 is not consecutive with other remaining RBs, and cannot be allocated to the conventional UE, thereby resulting in relatively low resource utilization in the system bandwidth.

When the manner of this embodiment is used, it may be determined, based on Table 6 or Table 7, that the network device may indicate an allocated resource block to the BL/CE UE by using the value of the second bit based on the third correspondence. That is, the network device may indicate a narrowband whose index is 1 by using the value of the first bit, and allocate RBs numbered 6 to 11 (resource blocks numbered n−1, n, n+1, n+2, n+3, and n+4) to the BL/CE UE. In this scenario, after the network device allocates the RBs to the BL/CE UE, remaining RBs in the system bandwidth are consecutive, so that remaining resources can be used by the conventional UE to a maximum extent, thereby improving resource utilization in the system bandwidth.

It should be noted that in this scenario, when a system bandwidth is 5 MHz, if a narrowband index of the narrowband indicated by the value of the first bit is 0 or 1, the network device may indicate, by using the second bit, one RB or a plurality of consecutive RBs in the narrowband that are allocated to the BL/CE UE. In this case, the allocated RBs do not include an RB outside the narrowband, and a decimal value corresponding to the second bit is not greater than 20.

In the foregoing implementation, the network device may add, to the first bit of the DCI, the narrowband index of the narrowband allocated by the network device to the BL/CE UE, to indicate the narrowband allocated by the network device to the BL/CE UE. That is, the narrowband in the foregoing implementation is the narrowband indicated by the value of the first bit.

The network device may indicate, by using the value of the second bit, a specific RB allocated to the BL/CE UE. For example, one or more of the first correspondence to the ninth correspondence are configured on both the network device side and the BL/CE UE side. In this way, the network device may indicate, by using a value of the second bit in the configured table, at least one corresponding RB by using the value of the second bit when the first bit indicates the narrowband in the system bandwidth to the BL/CE UE.

In another embodiment, the value of the second bit may indicate one or more RBs in the narrowband, and an offset direction and an offset of the one or more RBs, to indirectly indicate at least one RB actually allocated to the BL/CE UE. Correspondingly, after receiving the DCI, the BL/CE UE may offset, based on an offset direction and an offset of an RB indicated by the value of the second bit, the RB indicated by the value of the second bit, to obtain an RB that can be actually used.

For example, for a narrowband whose system bandwidth is 3 MHz and whose narrowband index is 0, the value of the second bit may indirectly indicate, by indicating an RB in the narrowband 0, and an offset direction and an offset of the RB in the following Table 8, at least one RB actually allocated by the network device to the BL/CE UE. It can be understood that a correspondence that is between the at least one RB and the value of the second bit and that is obtained in the manner of Table 8 meets the foregoing correspondence that is between the value of the second bit and the at least one RB indicated by the value and that is obtained when the system bandwidth is 3 MHz and the narrowband index is 0.

TABLE 8

| RB in the narrowband whose narrowband index is 0 | Offset direction and offset of the RB |
|---|---|
| 0 and 1 | Offset of one RB towards a direction of a smaller RB index |
| 0, 1, and 2 | Offset of one RB towards a direction of a smaller RB index |
| 0, 1, 2, and 3 | Offset of one RB towards a direction of a smaller RB index |
| 0, 1, 2, 3, and 4 | Offset of one RB towards a direction of a smaller RB index |
| 0, 1, 2, 3, 4, and 5 | Offset of one RB towards a direction of a smaller RB index or offset of one RB towards a direction of a larger RB index |
| 1, 2, 3, 4, and 5 | Offset of one RB towards a direction of a larger RB index |
| 2, 3, 4, and 5 | Offset of one RB towards a direction of a larger RB index |
| 3, 4, and 5 | Offset of one RB towards a direction of a larger RB index |
| 4 and 5 | Offset of one RB towards a direction of a larger RB index |

For example, for narrowband whose system bandwidth is 3 MHz and whose narrowband index is 1, the value of the second bit may indirectly indicate, b indicating an RB in the narrowband whose narrowband index is 1, and an offset direction and an offset of the RB in the following Table 9, at least one RB actually allocated by the network device to the BL/CE UE. It can be understood that a correspondence that is between the at least one RB and the value of the second bit and that is obtained in the manner of Table 9 meets the foregoing correspondence that is between the value of the second bit and the at least one RB indicated by the value and that is obtained when the system bandwidth is 3 MHz and the narrowband index is 1.

TABLE 9

| RB in the narrowband whose narrowband index is 1 | Offset direction and offset of the RB |
|---|---|
| 0 | Offset of one or two RBs towards a direction of a smaller RB index |
| 0 and 1 | Offset of two RBs towards a direction of a smaller RB index |
| 0, 1, and 2 | Offset of one or two RBs towards a direction of a smaller RB index of a smaller RB index |
| 0, 1, 2, and 3 | Offset of two RBs towards a direction of a smaller RB index |
| 0, 1, 2, 3, and 4 | Offset of one or two RBs towards a direction of a smaller RB index |
| 0, 1, 2, 3, 4, and 5 | Offset of two RBs towards a direction of a smaller RB index |
| 1, 2, 3, 4, and 5 | Off set of one RB towards a direction of a larger RB index |
| 3, 4, and 5 | Offset of one RB towards a direction of a larger RB index |
| 5 | Offset of one RB towards a direction of a larger RB index |

For example, for narrowband whose system bandwidth is 5 MHz and whose narrowband index is 2, the value of the second bit may indirectly indicate, by indicating an RB in the narrowband whose narrowband index is 2, and an offset direction and an offset of the RB in the following Table 10, at least one RB actually allocated by the network device to the BL/CE UE. It can be understood that a correspondence that is between the at least one RB and the value of the second bit and that is obtained in the manner of Table 10 meets the foregoing correspondence that is between the value of the second bit and the at least one RB indicated by the value and that is obtained when the system bandwidth is 5 MHz and the narrowband index is 2.

TABLE 10

| RB in the narrowband whose narrowband index is 2 | Offset direction and offset of the RB |
|---|---|
| 0 and 1 | Offset of one RB towards a direction of a smaller RB index |
| 0, 1, and 2 | Offset of one RB towards a direction of a smaller RB index |
| 0, 1, 2, and 3 | Offset of one RB towards a direction of a smaller RB index |
| 0, 1, 2, 3, and 4 | Offset of one RB towards a direction of a smaller RB index |
| 0, 1, 2, 3, 4, and 5 | Offset of one RB towards a direction of a smaller RB index or offset of one RB towards a direction of a larger RB index |
| 1, 2, 3, 4, and 5 | Offset of one RB towards a direction of a larger RB index |
| 2, 3, 4, and 5 | Offset of one RB towards a direction of a larger RB index |
| 3, 4, and 5 | Offset of one RB towards a direction of a larger RB index |
| 4 and 5 | Offset of one RB towards a direction of a larger RB index |

For example, for a narrowband whose system bandwidth is 5 MHz and whose narrowband index is 3, the value of the second bit may indirectly indicate, by indicating an RB in the narrowband whose narrowband index is 3, and an offset direction and an offset of the RB in the following Table 11, at least one RB actually allocated by the network device to the BL/CE UE. It can be understood that a correspondence that is between the at least one RB and the value of the second bit and that is obtained in the manner of Table 11 meets the foregoing correspondence that is between the value of the second bit and the at least one RB indicated by the value and that is obtained when the system bandwidth is 5 MHz and the narrowband index is 3.

TABLE 11

| RB in the narrowband whose narrowband index is 3 | Offset direction and offset of the RB |
|---|---|
| 0 and 1 | Offset of one RB towards a direction of a smaller RB index |
| 0, 1, and 2 | Offset of one RB towards a direction of a smaller RB index |
| 0, 1, 2, and 3 | Offset of one RB towards a direction of a smaller RB index |
| 0, 1,2, 3, and 4 | Offset of one RB towards a direction of a smaller RB index |
| 0, 1,2, 3,4, and 5 | Offset of one RB towards a direction of a smaller RB index |

For example, for an RB in a narrowband whose system bandwidth is 10 MHz and whose narrowband index is 0, 1, 2, 3, 4, 5, and/or 6, the value of the second bit may indirectly indicate, by indicating the RB in the narrowband whose narrowband index is 0, 1, 2, 3, 4, 5, and/or 6, and an offset direction and an offset of the RB in the following Table 12, at least one RB actually allocated by the network device to the BL/CE UE. It can be understood that a correspondence that is between the at least one RB and the value of the second bit and that is obtained in the manner of Table 12 meets the foregoing correspondence that is between the value of the second bit and the at least one RB indicated by the value and that is obtained when the system bandwidth is 10 MHz and the narrowband index is 0, 1, 2, 3, 4, 5, and/or 6.

TABLE 12

| RB in the narrowband whose narrowband index is 0, 1, 2, 3, 4, 5, and/or 6 | Offset direction and offset of the RB |
|---|---|
| 0 and 1 | Offset of one RB towards a direction of a smaller RB index |
| 0, 1, and 2 | Offset of one RB towards a direction of a smaller RB index |
| 0, 1,2, and 3 | Offset of one RB towards a direction of a smaller RB index |
| 0, 1,2, 3, and 4 | Offset of one RB towards a direction of a smaller RB index |
| 0, 1, 2, 3, 4, and 5 | Offset of one RB towards a direction of a smaller RB index or offset of two RBs towards a direction of a larger RB index |
| 1, 2, 3, 4, and 5 | Offset of two RBs towards a direction of a larger RB index |
| 2, 3, 4, and 5 | Offset of two RBs towards a direction of a larger RB index |
| 3, 4, and 5 | Offset of two RBs towards a direction of a larger RB index |
| 4 and 5 | Offset of two RBs towards a direction of a larger RB index |

For example, for an RB in a narrowband whose system bandwidth is 10 MHz and whose narrowband index is 7, the value of the second bit may indirectly indicate, by indicating the RB in the narrowband whose narrowband index is 7, and an offset direction and an offset of the RB in the following Table 13, at least one RB actually allocated by the network device to the BL/CE UE. It can be understood that a correspondence that is between the at least one RB and the value of the second bit and that is obtained in the manner of Table 13 meets the foregoing correspondence that is between the value of the second bit and the at least one RB indicated by the value and that is obtained when the system bandwidth is 10 MHz and the narrowband index is 7.

TABLE 13

| RB in the narrowband whose narrowband index is 7 | Offset direction and offset of the RB |
|---|---|
| 0 and 1 | Offset of one RB towards a direction of a smaller RB index |
| 0, 1, and 2 | Offset of one RB towards a direction of a smaller RB index |
| 0, 1, 2, and 3 | Offset of one RB towards a direction of a smaller RB index |
| 0, 1,2, 3, and 4 | Offset of one RB towards a direction of a smaller RB index |
| 0, 1, 2, 3, 4, and 5 | Offset of one RB towards a direction of a smaller RB index |
| 1, 2, 3, 4, and 5 | Offset of one RB towards a direction of a larger RB index |
| 2, 3, 4, and 5 | Offset of one RB towards a direction of a larger RB index |
| 4 and 5 | Offset of one RB towards a direction of a larger RB index |
| 5 | Offset of one RB towards a direction of a larger RB index |

For example, for an RB in a narrowband whose system bandwidth is 15 MHz and whose narrowband index is 0, 2, and/or 4, the value of the second bit may indirectly indicate, by indicating the RB in the narrowband whose narrowband index is 0, 2, and/or 4, and an offset direction and an offset of the RB in the following Table 14, at least one RB actually allocated by the network device to the BL/CE UE. It can be understood that a correspondence that is between the at least one RB and the value of the second bit and that is obtained in the manner of Table 14 meets the foregoing correspondence that is between the value of the second bit and the at least one RB indicated by the value and that is obtained when the system bandwidth is 15 MHz and the narrowband index is 0, 2, and/or 4.

TABLE 14

| RB in the narrowband whose narrowband index is 0, 2, and/or 4 | Offset direction and offset of the RB |
|---|---|
| 0 and 1 | Offset of one RB towards a direction of a smaller RB index |
| 0, 1, and 2 | Offset of one RB towards a direction of a smaller RB index |
| 0, 1,2, and 3 | Offset of one RB towards a direction of a smaller RB index |
| 0, 1,2, 3, and 4 | Offset of one RB towards a direction of a smaller RB index |
| 0, 1,2, 3, 4, and 5 | Offset of one RB towards a direction of a smaller RB index or offset of one RB towards a direction of a larger RB index |
| 1, 2, 3, 4, and 5 | Offset of one RB towards a direction of a larger RB index |
| 2, 3, 4, and 5 | Offset of one RB towards a direction of a larger RB index |
| 3,4, and 5 | Offset of one RB towards a direction of a larger RB index |
| 4 and 5 | Offset of one RB towards a direction of a larger RB index |

For example, for an RB in a narrowband whose system bandwidth is 15 MHz and whose narrowband index is 1, 3, and/or 5, the value of the second bit may indirectly indicate, by indicating the RB in the narrowband whose narrowband index is 1, 3, and/or 5, and an offset direction and an offset of the RB in the following Table 15, at least one RB actually allocated by the network device to the BL-CE UE. It can be understood that a correspondence that is between the at least one RB and the value of the second bit and that is obtained in the manner of Table 15 meets the foregoing correspondence that is between the value of the second bit and the at least one RB indicated by the value and that is obtained when the system bandwidth is 15 MHz and the narrowband index is 1, 3, and/or 5.

TABLE 15

| RB in the narrowband whose narrowband index is 1, 3, and/or 5 | Offset direction and offset of the RB |
|---|---|
| 0 and 1 | Offset of three RBs towards a direction of a smaller RB index |
| 0, 1, and 2 | Offset of three RBs towards a direction of a smaller RB index |
| 0, 1, 2, and 3 | Offset of three RBs towards a direction of a smaller RB index |
| 0, 1, 2, 3, and 4 | Offset of three RBs towards a direction of a smaller RB index |
| 0, 1, 2, 3, 4, and 5 | Offset of one RB towards a direction of a smaller RB index or offset of one RB towards a direction of a larger RB index |
| 1, 2, 3, 4, and 5 | Offset of three RBs towards a direction of a larger RB index |
| 2, 3, 4, and 5 | Offset of three RBs towards a direction of a larger RB index |
| 3, 4, and 5 | Offset of three RBs towards a direction of a larger RB index |
| 4 and 5 | Offset of three RBs towards a direction of a larger RB index |

For example, for an RB in a narrowband whose system bandwidth is 15 MHz and whose narrowband index is 6, 8, and/or 10, the value of the second bit may indirectly indicate, by indicating the RB in the narrowband whose narrowband index is 6, 8, and/or 10, and an offset direction and an offset of the RB in the following Table 16, at least one RB actually allocated by the network device to the BL/CE UE. It can be understood that a correspondence that is between the at least one RB and the value of the second bit and that is obtained in the manner of Table 16 meets the foregoing correspondence that is between the value of the second bit and the at least one RB indicated by the value and that is obtained when the system bandwidth is 15 MHz and the narrowband index is 6, 8, and/or 10.

TABLE 16

| RB in the narrowband whose narrowband index is 6, 8, and/or 10 | Offset direction and offset of the RB |
|---|---|
| 0 and 1 | Offset of two RBs towards a direction of a smaller RB index |
| 0, 1, and 2 | Offset of two RBs towards a direction of a smaller RB index |
| 0, 1, 2, and 3 | Offset of two RBs towards a direction of a smaller RB index |
| 0, 1, 2, 3, and 4 | Offset of two RBs towards a direction of a smaller RB index |
| 0, 1, 2, 3, 4, and 5 | Offset of two RBs towards a direction of a smaller RB index |

For example, for an RB in a narrowband whose system bandwidth is 15 MHz and whose narrowband index is 7 and/or 9, the value of the second bit may indirectly indicate, by indicating the RB in the narrowband whose narrowband index is 7 and/or 9, and an offset direction and an offset of the RB in the following Table 17, at least one RB actually allocated by the network device to the BL/CE UE. It can be understood that a correspondence that is between the at least one RB and the value of the second bit and that is obtained in the manner of Table 17 meets the foregoing correspondence that is between the value of the second bit and the at least one RB indicated by the value and that is obtained when the system bandwidth is 15 MHz and the narrowband index is 7 and/or 9.

TABLE 17

| RB in the narrowband whose narrowband index is 7 and/or 9 | Offset direction and offset of the RB |
|---|---|
| 0, 1, 2, 3, 4, and 5 | Offset of two RBs towards a direction of a larger RB index |
| 1, 2, 3, 4, and 5 | Offset of two RBs towards a direction of a larger RB index |
| 2, 3, 4, and 5 | Offset of two RBs towards a direction of a larger RB index |
| 3, 4, and 5 | Offset of two RBs towards a direction of a larger RB index |
| 4 and 5 | Offset of two RBs towards a direction of a larger RB index |

For example, for an RB in a narrowband whose system bandwidth is 15 MHz and whose narrowband index is 11, the value of the second bit may indirectly indicate, by indicating the RB in the narrowband whose narrowband index is 11, and an offset direction and an offset of the RB in the following Table 18, at least one RB actually allocated by the network device to the BL/CE UE. It can be understood that a correspondence that is between the at least one RB and the value of the second bit and that is obtained in the manner of Table 18 meets the foregoing correspondence that is between the value of the second bit and the at least one RB indicated by the value and that is obtained when the system bandwidth is 15 MHz and the narrowband index is 11.

TABLE 18

| RB in the narrowband whose narrowband index is 11 | Offset direction and offset of the RB |
|---|---|
| 0, 1, 2, 3, 4, and 5 | Offset of one RB towards a direction of a larger RB index |
| 1, 2, 3, 4, and 5 | Offset of one RB towards a direction of a larger RB index |
| 2, 3, 4, and 5 | Offset of one RB towards a direction of a larger RB index |
| 3, 4, and 5 | Offset of one RB towards a direction of a larger RB index |
| 4 and 5 | Offset of one RB towards a direction of a larger RB index |

For example, for an RB in a narrowband whose system bandwidth is 20 MHz and whose narrowband index is 0, 2, 4, 6, 8, 10, 12, and/or 14, the value of the second bit may indirectly indicate, by indicating the RB in the narrowband whose narrowband index is 0, 2, 4, 6, 8, 10, 12 and/or 14 and an offset direction and an offset of the RB in the following Table 19, at least one RB actually allocated by the network device to the BL CE UE. It can be understood that a correspondence that is between the at least one RB and the value of the second bit and that is obtained in the manner of Table 19 meets the foregoing correspondence that is between the value of the second bit and the at least one RB indicated by the value and that is obtained when the system bandwidth is 20 MHz and the narrowband index is 0, 2, 4, 6, 8, 10, 12, and/or 14.

TABLE 19

| RB in the narrowband whose narrowband index is 0, 2, 4, 6, 8, 10, 12, and/or 14 | Offset direction and offset of the RB |
|---|---|
| 0 and 1 | Offset of two RBs towards a direction of a smaller RB index |
| 0, 1, and 2 | Offset of two RBs towards a direction of a smaller RB index |
| 0, 1,2, and 3 | Offset of two RBs towards a direction of a smaller RB index |
| 0, 1, 2, 3, and 4 | Offset of two RBs towards a direction of a smaller RB index |
| 0, 1, 2, 3, 4, and 5 | Offset of two RBs towards a direction of a smaller RB index |

For example, for an RB in a narrowband whose system bandwidth is 20 MHz and whose narrowband index is 1, 3, 5, 7, 9, 13, and/or 15, the value of the second bit may indirectly indicate, by indicating the RB in the narrowband whose narrowband index is 1, 3, 5, 7, 9, 11, 13, and/or 15, and an offset direction and an offset of the RB in the following Table 20 at least one RB actually allocated by the network device to the BL/CE UE. It can be understood that a correspondence that is between the at least one RB and the value of the second bit and that is obtained in the manner of Table 20 meets the foregoing correspondence that is between the value of the second bit and the at least one RB indicated by the value and that is obtained when the system bandwidth is 20 MHz and the narrowband index is 1, 3, 5, 7, 9, 11, 13, and/or 15.

TABLE 20

| RB in the narrowband whose narrowband index is 1, 3, 5, 7, 9, 11, 13, and/or 15 | Offset direction and offset of the RB |
|---|---|
| 0, 1, 2, 3, 4, and 5 | Offset of two RBs towards a direction of a larger RB index |
| 1, 2, 3, 4, and 5 | Offset of two RBs towards a direction of a larger RB index |
| 2, 3, 4, and 5 | Offset of two RBs towards a direction of a larger RB index |
| 3, 4, and 5 | Offset of two RBs towards a direction of a larger RB index |
| 4 and 5 | Offset of two RBs towards a direction of a larger RB index |

According to the method provided in this embodiment of this application, the network device is not confined to allocating an RB in a narrowband to the BL/CE UE, but may also allocate an RB outside the narrowband to the BL/CE UE, so that resources are more flexibly allocated by the network device to the BL/CE UE. In this way, when the network device allocates resources to the BL/CE UE in one subframe, a quantity of fragmented resources that cannot be used by conventional UE in remaining resources in a system bandwidth can be reduced, so that the remaining resources can be used by other conventional UE to a maximum extent, thereby improving system resource utilization.

As described in the foregoing embodiment, when the second bit in the DCI includes five bits, the second bit corresponds to a total of eleven decimal values that are greater than 20 and less than or equal to 31. When the network device indicates the at least one RB in this embodiment of this application in the manner shown in Table 3 or any one of the first correspondence table to the ninth correspondence table, only a maximum of nine decimal values that are corresponding to the second bit and that are greater than 20 and less than or equal to 31 may be used. In other words, in this scenario, two decimal values that are corresponding to the second bit and that are greater than 20 and less than or equal to 31 are unused values.

In another implementation of this embodiment of this application, by using one of the two remaining unused values, the network device instructs the BL/CE UE to prematurely terminate monitoring of a downlink control channel and prematurely terminate sending of the uplink data to the network device, or instructs the BL/CE UE to prematurely terminate monitoring of a downlink control channel and indicates acknowledgment information of the network device for the uplink data. By using the other value in the remaining two redundant values, the network device instructs the BL/CE UE to prematurely terminate sending of the uplink data to the network device, or indicates acknowledgment information of the BL/CE UE or the network device for the uplink data. The downlink control channel herein may be, for example, an MPDCCH. The acknowledgment information of the network device for the uplink data may be, for example, hybrid automatic repeat request (HARQ) acknowledgment information. Premature termination described in this embodiment of the present invention may be an alternative termination.

In other words, if the value of the second bit in the DCI sent by the network device to the BL/CE UE does not belong to the first set, the second bit is used to indicate the BL/CE UE to prematurely terminate monitoring of the downlink control channel and prematurely terminate sending of the uplink data to the network device, or the second bit is used to indicate the BL/CE UE to prematurely terminate monitoring of the downlink control channel and is used to indicate the acknowledgment information of the network device for the uplink data. Therefore, when the value of the second bit in the DCI received by the BL/CE UE does not belong to the first set, the BL/CE UE may terminate monitoring of the downlink control channel and terminate sending of the uplink data to the network device. Correspondingly, the network device may terminate sending of the downlink control channel to the BL/CE UE and terminate receiving of the uplink data. In this manner, power consumption of the UE can be reduced.

Alternatively, if the value of the second bit in the DCI sent by the network device to the BL/CE UE does not belong to the first set, the second bit is used to indicate the BL/CE UE to prematurely terminate sending of the uplink data to the network device, or the second bit is used to indicate the acknowledgment information of the BL/CE UE or the network device for the uplink data. Therefore, when the second bit in the DC received by the BL/CE UE does not belong to the first set, the BL/CE UE may stop sending the uplink data to the network device. Correspondingly, the network device may terminate receiving of the uplink data. In this manner, power consumption of the UE can be reduced.

During specific implementation, when a quantity of values of the second bit that are included in the first set is less than or equal to 9 (for example, a quantity of values of the second bit shown in Table 3, and the first correspondence table to the ninth correspondence table), the value of the second bit may be one or more of {21, 22, 23, 24, 25, 26, 27, 28, 29}, and a value that is of the second bit and that does not belong to the first set may be, for example, any one of {30, 31}. In this case, an average Hamming distance between the value that is of the second bit and that does not belong to the first set and a decimal value that is corresponding to the second bit and that is not greater than 20 is the largest, thereby ensuring detection performance of the DC. Alternatively, the value of the second bit may be one or more of {22, 23, 24, 25, 26, 27, 28, 29, 30}, and a value that is of the second bit and that does not belong to the first set may be, for example, any one of {21, 31}. Alternatively, the value of the second bit may be one or more of {22, 23, 24, 25, 27, 28, 29, 30, 31}, and a value that is of the second bit and that does not belong to the first set may be, for example, any one of {21, 26}. In this case, a Hamming distance between values of the second bit that do not belong to the first set is 4, and the values of the second bit that do not belong to the first set are two values corresponding to a largest Hamming distance that is obtained when a decimal value corresponding to the second bit is greater than 20, thereby ensuring detection performance of the DCI. Alternatively, the value of the second bit may be one or more of {21, 22, 25, 26, 27, 28, 29, 30, 31}, and a value that is of the second bit and that does not belong to the first set may be, for example, any one of {23, 24}. In this case, a Hamming distance between values of the second bit that do not belong to the first set is 4, and the values of the second bit that do not belong to the first set are two values corresponding to a largest Hamming distance that is obtained when a decimal value corresponding to the second bit is greater than 20, thereby ensuring detection performance of the DCI. When a quantity of values of the second bit that are included in the first set is less than or equal to 11 (for example, a quantity of values of the second bit shown in Table 4 and Table 5), the value of the second bit may be one or more of {21, 22, 23, 24, 25, 26, 27, 28, 29, 30, 31}.

It should be noted that the value of the second bit is not specifically limited in the foregoing table. In addition, values of the second bit in the tables may be a same value or may be different values. For example, the value of the second bit in the first item in Table 3 may be, for example, 21, the value of the second bit in the second item may be, for example, 29, and the value of the second bit in the first item in Table 4 may be, for example, 24.

In this embodiment of this application, 11 unused values in existing DCI are used to indicate allocated resources and premature termination for the BL/CE UE, thereby avoiding an increase in bit overheads of the DCI.

Figure 6:
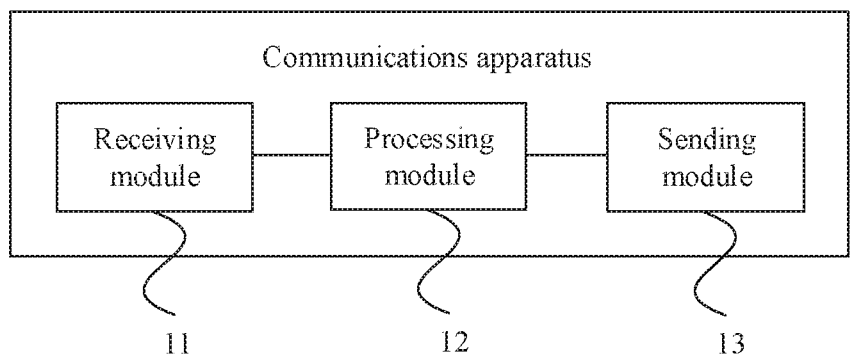
FIG. 6 is a schematic structural diagram of a communications apparatus according to an embodiment of this application.

FIG. 6 is a schematic structural diagram of a communications apparatus according to an embodiment of this application. The communications apparatus in this embodiment may be BL/CE UE, or may be a chip applied to BL/CE UE. The communications apparatus may be configured to perform a function of the BL/CE in the method embodiment shown in FIG. 5. As shown in FIG. 6, the communications apparatus may include a receiving module 11, a processing module 12, and a sending module 13.

The receiving module 11 is configured to receive downlink control information sent by a second communications apparatus, where the downlink control information includes a first bit and a second bit, when a value of the second bit is a value in a first set, a value of the first bit is used to indicate a narrowband allocated by the second communications apparatus, the value of the second bit is used to indicate at least one resource block allocated by the second communications apparatus, a quantity of the at least one resource block is less than or equal to a quantity of resource blocks included in the narrowband, and there is a resource block that does not belong to the narrowband in the at least one resource block, where the second bit is M bits, the first set includes N values, N is a positive integer less than $2^M$, and M is a positive integer. For example, M is equal to 5. Each of the N values is greater than 20 and less than or equal to 31, and N is greater than or equal to 1 and less than or equal to 9. For specific values of the N values, refer to the description in the foregoing method embodiment. Details are not described herein again.

The processing module 12 is configured to control the sending module 13 to send uplink data to the second communications apparatus on the at least one resource block, or control the receiving module 11 to receive, on the at least one resource block, downlink data sent by the second communications apparatus.

In a possible design, a smallest number of a resource block included in the narrowband is n, a largest number of a resource block included in the narrowband is n+5, a smallest number of a resource block in the at least one resource block is s, and a largest number of a resource block in the at least one resource block is t; and the resource block numbered s is a resource block with a smallest number in a resource block group, and s is a maximum value less than n; or the resource block numbered t is a resource block with a largest number in a resource block group, and t is a minimum value greater than n+5.

In this implementation, that the value of the second bit is used to indicate the at least one resource block allocated by the second communications apparatus to the first communications apparatus includes: the at least one resource block allocated by the second communications apparatus to the first communications apparatus is indicated based on a correspondence between the value of the second bit, the smallest number of the resource block in the at least one resource block indicated by the value of the second bit, and a quantity of consecutive resource blocks included in the at least one resource block. For the correspondence between the value of the second bit, the smallest number of the resource block in the at least one resource block indicated by the value of the second bit, and the quantity of the consecutive resource blocks included in the at least one resource block, refer to Table 3 to Table 5 in the foregoing method embodiments.

In a possible design, that the value of the second bit is used to indicate the at least one resource block allocated by the second communications apparatus to the first communications apparatus includes: the at least one resource block allocated by the second communications apparatus to the first communications apparatus is indicated based on a correspondence between the value of the second bit and the at least one resource block indicated by the value of the second bit. In this implementation, for the correspondence between the value of the second bit and the at least one resource block indicated by the value of the second bit, refer to the first correspondence to the ninth correspondence listed in the foregoing method embodiments. Correspondingly, for different system bandwidths and different narrowband indexes, the correspondence between the value of the second bit and the at least one RB indicated by the value may be that shown in one or more items in the following Table 6, or for different system bandwidths and different narrowband indexes, the correspondence between the value of the second bit and the at least one RB indicated by the value may be that shown in one or more items in the following Table 7.

In a possible design, when the value of the second bit does not belong to the first set, the value of the second bit is used to indicate to prematurely terminate sending of the uplink data to the second communications apparatus, or the value of the second bit is used to indicate acknowledgment information of the second communications apparatus for the uplink data; and the processing module 12 is further configured to control the sending module 13 to terminate sending of the uplink data to the second communications apparatus.

In a possible design, a coverage enhancement mode of the communications apparatus is a coverage enhancement mode A.

The communications apparatus provided in this embodiment of this application may perform an action on a BL/CE UE side in the foregoing method embodiments. Their implementation principles and technical effects are similar, and details are not described herein again.

Figure 7:
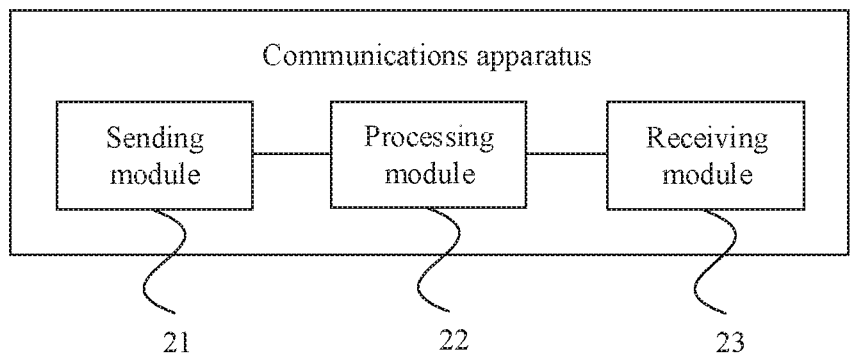
FIG. 7 is a schematic structural diagram of another communications apparatus according to an embodiment of this application.

FIG. 7 is a schematic structural diagram of another communications apparatus according to an embodiment of this application. The communications apparatus in this embodiment may be a network device, or may be a chip applied to a network device. The communications apparatus may be configured to perform a function of the network device in the method embodiment shown in FIG. 5. As shown in FIG. 7, the communications apparatus may include a sending module 21, a processing module 22, and a receiving module 23.

The sending module 21 is configured to send downlink control information to a first communications apparatus, where the downlink control information includes a first bit and a second bit, when a value of the second bit is a value in a first set, a value of the first bit is used to indicate a narrowband allocated by the second communications apparatus, the value of the second bit is used to indicate at least one resource block allocated to the first communications apparatus, a quantity of the at least one resource block is less than or equal to a quantity of resource blocks included in the narrowband, and there is a resource block that does not belong to the narrowband in the at least one resource block, where the second bit is M bits, the first set includes N values, N is a positive integer less than $2^M$, and M is a positive integer. For example, M is equal to 5. Each of the N values is greater than 20 and less than or equal to 31, and N is greater than or equal to 1 and less than or equal to 9. For specific values of the N values, refer to the description in the foregoing method embodiments. Details are not described herein again.

The processing module 22 is configured to control the receiving module 23 to receive, on the at least one resource block, uplink data sent by the first communications apparatus, or control the sending module 21 to send downlink data to the first communications apparatus on the at least one resource block.

In a possible design, a smallest number of a resource block included in the narrowband is n, a largest number of a resource block included in the narrowband is n+5, a smallest number of a resource block in the at least one resource block is s, and a largest number of a resource block in the at least one resource block is t; and the resource block numbered s is a resource block with a smallest number in a resource block group, and s is a maximum value less than n; or the resource block numbered t is a resource block with a largest number in a resource block group, and t is a minimum value greater than n+5.

In this implementation, that the value of the second bit is used to indicate the at least one resource block allocated by the second communications apparatus to the first communications apparatus includes: the at least one resource block allocated by the second communications apparatus to the first communications apparatus is indicated based on a correspondence between the value of the second bit, the smallest number of the resource block in the at least one resource block indicated by the value of the second bit, and a quantity of consecutive resource blocks included in the at least one resource block. For the correspondence between the value of the second bit, the smallest number of the resource block in the at least one resource block indicated by the value of the second bit, and the quantity of the consecutive resource blocks included in the at least one resource block, refer to Table 3 to Table 5 in the foregoing method embodiments.

In a possible design, that the value of the second bit is used to indicate the at least one resource block allocated by the second communications apparatus to the first communications apparatus includes: the at least one resource block allocated by the second communications apparatus to the first communications apparatus is indicated based on a correspondence between the value of the second bit and the at least one resource block indicated by the value of the second bit. In this implementation, for the correspondence between the value of the second bit and the at least one resource block indicated by the value of the second bit, refer to the first correspondence to the ninth correspondence listed in the foregoing method embodiments. Correspondingly, for different system bandwidths and different narrowband indexes, the correspondence between the value of the second bit and the at least one RB indicated by the value may be that shown in one or more items in the following Table 6, or for different system bandwidths and different narrowband indexes, the correspondence between the value of the second bit and the at least one RB indicated by the value may be that shown in one or more items in the following Table 7.

In a possible design, when the value of the second bit does not belong to the first set, the value of the second bit is used to indicate the first communications apparatus to prematurely terminate monitoring of a downlink control channel and terminate sending of uplink data, or the value of the second bit is used to indicate the first communications apparatus to prematurely terminate monitoring of a downlink control channel and is used to indicate acknowledgment information for the uplink data; and the processing module 22 is further configured to control the sending module 21 to prematurely terminate sending of the downlink control channel to the first communications apparatus, and control the receiving module 23 to terminate receiving of the uplink data.

In a possible design, when the value of the second bit does not belong to the first set, the value of the second bit is used to indicate the first communications apparatus to prematurely terminate sending of the uplink data to the second communications apparatus, or the value of the second bit is used to indicate acknowledgment information of the second communications apparatus for the uplink data.

The processing module 22 is further configured to control the receiving module 23 to terminate receiving of the uplink data.

In a possible design, a coverage enhancement mode of the first communications apparatus is a coverage enhancement mode A.

The communications apparatus provided in this embodiment of this application may perform an action on a network device side in the foregoing method embodiments. Their implementation principles and technical effects are similar, and details are not described herein again.

It should be understood that the receiving module may be a receiver in actual implementation, and the sending module may be a transmitter in actual implementation. The processing module may be implemented in a form of software invoked by a processing element, or may be implemented in a form of hardware. For example, the processing module may be a separately disposed processing element, or may be integrated into a chip of the foregoing apparatus for implementation. In addition, the processing module may be stored in a memory of the foregoing apparatus in a form of program code, and is invoked by a processing element of the foregoing apparatus to perform a function of the processing module. In addition, these modules may be all or partially integrated, or may be implemented independently. The processing element described herein may be an integrated circuit that has a signal processing capability. In actual implementation, the steps of the foregoing methods or the foregoing modules may be performed by an integrated logic circuit of hardware in the processing element or instructions in a form of software.

For example, the foregoing modules may be configured as one or more integrated circuits for implementing the methods, such as one or more application-specific integrated circuits (ASIC), one or more digital signal processors (DSP), or one or more field programmable gate arrays (FPGA). For another example, when one of the foregoing modules is implemented by scheduling program code by a processing element, the processing element may be a general-purpose processor, for example, a central processing unit (CPU) or another processor that can invoke the program code. For another example, these modules may be integrated together, and implemented in a form of a system-on-a-chip (SOC).

Figure 8:
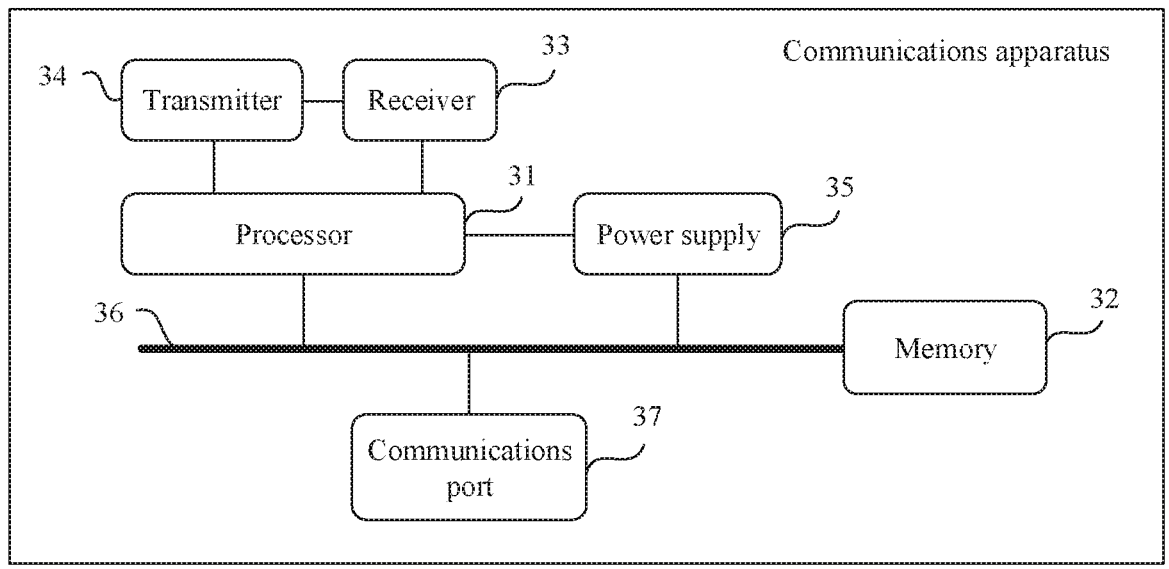
FIG. 8 is a schematic structural diagram of still another communications apparatus according to an embodiment of this application.

FIG. 8 is a schematic structural diagram of another communications apparatus according to an embodiment of this application. As shown in FIG. 8, the communications apparatus may include a processor 31 (for example, a CPU), a memory 32, a receiver 33, and a transmitter 34. Both the receiver 33 and the transmitter 34 are coupled to the processor 31. The processor 31 controls receiving actions of the receiver 33 and sending actions of the transmitter 34. The memory 32 may include a high-speed random access memory (RAM), and may further include a non-volatile memory (NVM), for example, at least one magnetic disk memory. The memory 32 may store various instructions, to complete various processing functions and implement method steps in this application. Optionally, the communications apparatus in this application may further include a power supply 35, a communications bus 36, and a communications port 37. The receiver 33 and the transmitter 34 may be integrated into a transceiver of the communications apparatus, or may be independent transceiver antennas on the communications apparatus. The communications bus 36 is configured to implement a communication connection between components. The communications port 37 is configured to implement a communication connection between the communications apparatus and other peripheral devices.

In this embodiment of this application, the memory 32 is configured to store computer-executable program code, and the program code includes an instruction. When the processor 31 executes the instruction, the instruction enables the processor 31 of the communications apparatus to perform a processing action of the BL/CE UE in the foregoing method embodiments, enables the receiver 33 to perform a receiving action of the BL/CE UE in the foregoing method embodiments, and enables the transmitter 34 to perform a sending action of the BL/CE UE in the foregoing method embodiments. Their implementation principles and technical effects are similar, and details are not described herein again.

Figure 9:
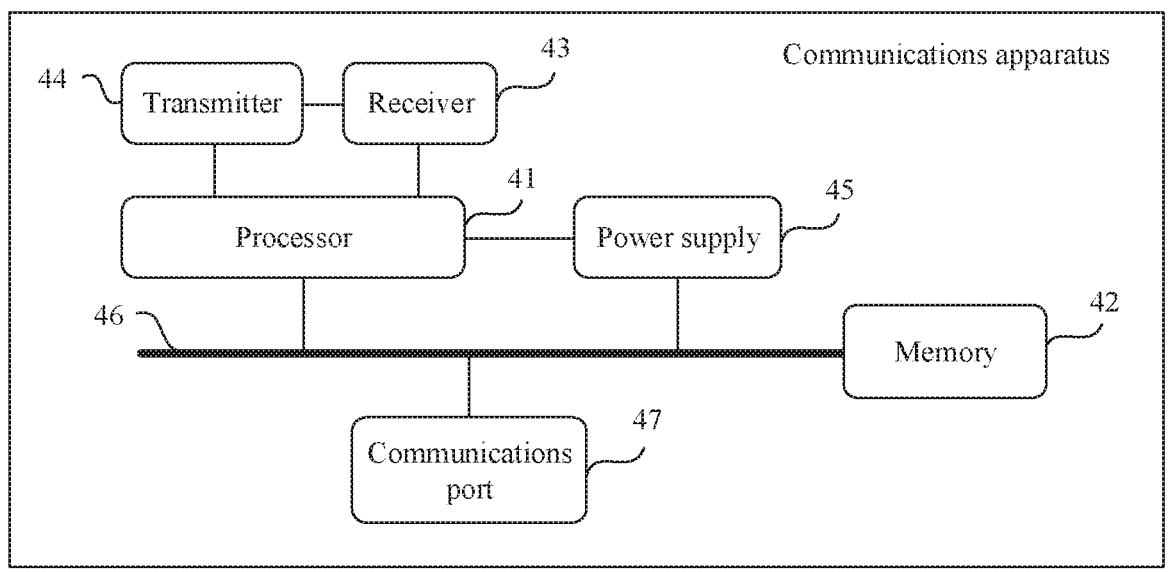
FIG. 9 is a schematic structural diagram of still another communications apparatus according to an embodiment of this application.

FIG. 9 is a schematic structural diagram of another communications apparatus according to an embodiment of this application. As shown in FIG. 9, the communications apparatus may include a processor 41 (such as a CPU), a memory 42, a receiver 43, and a transmitter 44. Both the receiver 43 and the transmitter 44 are coupled to the processor 41. The processor 41 controls receiving actions of the receiver 43 and sending actions of the transmitter 44. The memory 42 may include a high-speed RAM memory, and may further include a non-volatile memory NVM, for example, at least one magnetic disk memory. The memory 42 may store various instructions, to complete various processing functions and implement method steps in this application. Optionally, the communications apparatus in this application may further include a power supply 45, a communications bus 46, and a communications port 47. The receiver 43 and the transmitter 44 may be integrated into a transceiver of the communications apparatus, or may be independent transceiver antennas on the communications apparatus. The communications bus 46 is configured to implement a communication connection between components. The communications port 47 is configured to implement a communication connection between the communications apparatus and other peripheral devices.

In this application, the memory 42 is configured to store computer-executable program code, and the program code includes an instruction. When the processor 41 executes the instruction, the instruction enables the processor 41 of the communications apparatus to perform a processing action of the network device in the foregoing method embodiments, enables the receiver 43 to perform a receiving action of the network device in the foregoing method embodiments, and enables the transmitter 44 to perform a sending action of the network device in the foregoing method embodiments. Their implementation principles and technical effects are similar, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

"A plurality of" in this application refers to two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

It may be understood that numerical symbols used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A data transmission method, comprising:
    receiving, by a first communications apparatus, downlink control information from a second communications apparatus, wherein the downlink control information comprises a first bit and a second bit, a value of the first bit indicates a narrowband allocated by the second communications apparatus to the first communications apparatus, the value of the second bit indicates at least one resource block allocated by the second communications apparatus to the first communications apparatus, a quantity of the at least one resource block is less than or equal to a quantity of resource blocks comprised in the narrowband, and there is a resource block that does not belong to the narrowband in the at least one resource block, and wherein the second bit is 5 bits, the value of the second bit is a value in a first set, the first set comprises 10 values, and each of the 10 values is greater than 20 and less than or equal to 31; and
    sending, by the first communications apparatus, uplink data to the second communications apparatus on the at least one resource block, or receiving, on the at least one resource block, downlink data sent by the second communications apparatus.

2. The method according to claim 1, wherein the at least one resource block allocated by the second communications apparatus to the first communications apparatus is indicated based on a correspondence between the value of the second bit, a smallest number of a resource block in the at least one resource block indicated by the value of the second bit, and a quantity of consecutive resource blocks comprised in the at least one resource block.

3. The method according to claim 2, wherein,
    a smallest number of a resource block comprised in a narrowband is n, and a largest number of a resource block comprised in the narrowband is n+5;
    the smallest number of the resource block in the at least one resource block is s, the s is a smallest number of a resource block in a resource block group, and s is a maximum value less than n; or
    a largest number of a resource block in the at least one resource block is t, the resource block numbered t is a largest resource block in a resource block group, and t is a minimum value greater than n+5.

4. The method according to claim 2, wherein
    the smallest number of the resource block in the at least one resource block is s, a largest number of a resource block in the at least one resource block is s+L−1, and L is the quantity of consecutive resource blocks; or the largest number of the resource block in the at least one resource block is t, and the smallest number of the resource block in the at least one resource block is t−L+1, and L is the quantity of consecutive resource blocks, L is a positive integer greater than or equal to 2, and less than or equal to 6.

5. The method according to claim 2, wherein the correspondence between the value of the second bit, the smallest number of the resource block in the at least one resource block indicated by the value of the second bit, and the quantity of consecutive resource blocks comprised in the at least one resource block comprises one or more items in the following table:

| Value of the second bit | Smallest number of the resource block in the at least one resource block | Quantity of consecutive resource blocks comprised in the at least one resource block |
|---|---|---|
| 21 | s | 2 |
| 22 | s | 3 |
| 23 | s | 4 |
| 24 | s | 5 |
| 25 | s | 6 |
| 26 | t-5 | 6 |
| 27 | t-4 | 5 |
| 28 | t-3 | 4 |
| 29 | t-2 | 3 |
| 30 | t-1 | 2 |

6. A data transmission method, comprising:
    sending, by a second communications apparatus, downlink control information to a first communications apparatus, wherein the downlink control information comprises a first bit and a second bit, a value of the first bit indicates a narrowband allocated by the second communications apparatus to the first communications apparatus, the value of the second bit indicates at least one resource block allocated by the second communications apparatus to the first communications apparatus, a quantity of the at least one resource block is less than or equal to a quantity of resource blocks comprised in the narrowband, and there is a resource block that does not belong to the narrowband in the at least one resource block, and wherein the second bit is 5 bits, the value of the second bit is a value in a first set, the first set comprises 10 values, and each of the 10 values is greater than 20 and less than or equal to 31; and
    receiving, by the second communications apparatus on the at least one resource block, uplink data sent by the first communications apparatus, or sending downlink data to the first communications apparatus on the at least one resource block.

7. The method according to claim 6, wherein
    the at least one resource block allocated by the second communications apparatus to the first communications apparatus is indicated based on a correspondence between the value of the second bit, a smallest number of a resource block in the at least one resource block indicated by the value of the second bit, and a quantity of consecutive resource blocks comprised in the at least one resource block.

8. The method according to claim 7, wherein,
    a smallest number of a resource block comprised in a narrowband is n, and a largest number of a resource block comprised in the narrowband is n+5;
    the smallest number of the resource block in the at least one resource block is s, the s is a smallest number of a resource block in a resource block group, and s is a maximum value less than n; or a largest number of a resource block in the at least one resource block is t, the resource block numbered t is a largest resource block in a resource block group, and t is a minimum value greater than n+5.

9. The method according to claim 7, wherein, the smallest number of the resource block in the at least one resource block is s, a largest number of a resource block in the at least one resource block is s+L−1, and L is the quantity of consecutive resource blocks; or, the largest number of the resource block in the at least one resource block is t, and the smallest number of the resource block in the at least one resource block is t−L+1, and L is the quantity of consecutive resource blocks, L is a positive integer greater than or equal to 2, and less than or equal to 6.

10. The method according to claim 7, wherein the correspondence between the value of the second bit, the smallest number of the resource block in the at least one resource block indicated by the value of the second bit, and the quantity of consecutive resource blocks comprised in the at least one resource block comprises one or more items in the following table:

| Value of the second bit | Smallest number of the resource block in the at least one resource block | Quantity of consecutive resource blocks comprised in the at least one resource block |
|---|---|---|
| 21 | s | 2 |
| 22 | s | 3 |
| 23 | s | 4 |
| 24 | s | 5 |
| 25 | s | 6 |
| 26 | t-5 | 6 |
| 27 | t-4 | 5 |
| 28 | t-3 | 4 |
| 29 | t-2 | 3 |
| 30 | t-1 | 2 |

11. A communications apparatus, wherein the communications apparatus comprises:

a transceiver, configured to receive downlink control information from a second communications apparatus, wherein the downlink control information comprises a first bit and a second bit, a value of the first bit indicates a narrowband allocated by the second communications apparatus, the value of the second bit indicates at least one resource block allocated by the second communications apparatus, a quantity of the at least one resource block is less than or equal to a quantity of resource blocks comprised in the narrowband, and there is a resource block that does not belong to the narrowband in the at least one resource block, and wherein the second bit is 5 bits, the value of the second bit is a value in a first set, the first set comprises 10 values, and each of the 10 values is greater than 20 and less than or equal to 31; and at least one processor, configured to control the transceiver to send uplink data to the second communications apparatus on the at least one resource block, or control the transceiver to receive, on the at least one resource block, downlink data sent by the second communications apparatus.

12. The apparatus according to claim 11, wherein the at least one resource block allocated by the second communications apparatus is indicated based on a correspondence between the value of the second bit, a smallest number of a resource block in the at least one resource block indicated by the value of the second bit, and a quantity of consecutive resource blocks comprised in the at least one resource block.

13. The apparatus according to claim 12, wherein, a smallest number of a resource block comprised in a narrowband is n, and a largest number of a resource block comprised in the narrowband is n+5;

the smallest number of the resource block in the at least one resource block is s, the s is a smallest number of a resource block in a resource block group, and s is a maximum value less than n; or a largest number of a resource block in the at least one resource block is t, the resource block numbered t is a largest resource block in a resource block group, and t is a minimum value greater than n+5.

14. The apparatus according to claim 12, wherein, the smallest number of the resource block in the at least one resource block is s, a largest number of a resource block in the at least one resource block is s+L−1, and L is the quantity of consecutive resource blocks; or, the largest number of the resource block in the at least one resource block is t, and the smallest number of the resource block in the at least one resource block is t−L+1, and L is the quantity of consecutive resource blocks, L is a positive integer greater than or equal to 2, and less than or equal to 6.

15. The apparatus according to claim 12, wherein the correspondence between the value of the second bit, the smallest number of the resource block in the at least one resource block indicated by the value of the second bit, and the quantity of consecutive resource blocks comprised in the at least one resource block comprises one or more items in the following table:

| Value of the second bit | Smallest number of the resource block in the at least one resource block | Quantity of consecutive resource blocks comprised in the at least one resource block |
|---|---|---|
| 21 | s | 2 |
| 22 | s | 3 |
| 23 | s | 4 |
| 24 | s | 5 |
| 25 | s | 6 |
| 26 | t-5 | 6 |
| 27 | t-4 | 5 |
| 28 | t-3 | 4 |
| 29 | t-2 | 3 |
| 30 | t-1 | 2 |

16. A communications apparatus, comprising:

a transceiver, configured to send downlink control information to a first communications apparatus, wherein the downlink control information comprises a first bit and a second bit, a value of the first bit indicates a narrowband allocated to the first communications apparatus, the value of the second bit indicates at least one resource block allocated to the first communications apparatus, a quantity of the at least one resource block is less than or equal to a quantity of resource blocks comprised in the narrowband, and there is a resource block that does not belong to the narrowband in the at least one resource block, and wherein the second bit is 5 bits, the value of the second bit is a value in a first set, the first set comprises 10 values, and each of the 10 values is greater than 20 and less than or equal to 31; and at least one processor, configured to control a transceiver to receive, on the at least one resource block, uplink data sent by the first communications apparatus, or control the transceiver to send downlink data to the first communications apparatus on the at least one resource block.

17. The apparatus according to claim 16, wherein
the at least one resource block allocated to the first communications apparatus is indicated based on a correspondence between the value of the second bit, a smallest number of a resource block in the at least one resource block indicated by the value of the second bit, and a quantity of consecutive resource blocks comprised in the at least one resource block.

18. The apparatus according to claim 17, wherein,
a smallest number of a resource block comprised in a narrowband is n, and a largest number of a resource block comprised in the narrowband is n+5;
the smallest number of the resource block in the at least one resource block is s, the s is a smallest number of a resource block in a resource block group, and s is a maximum value less than n; or
a largest number of a resource block in the at least one resource block is t, the resource block numbered t is a largest resource block in a resource block group, and t is a minimum value greater than n+5.

19. The apparatus according to claim 17, wherein,
the smallest number of the resource block in the at least one resource block is s, a largest number of a resource block in the at least one resource block is s+L−1, and L is the quantity of consecutive resource blocks; or,
the largest number of the resource block in the at least one resource block is t, and the smallest number of the resource block in the at least one resource block is t−L+1, and L is the quantity of consecutive resource blocks, L is a positive integer greater than or equal to 2, and less than or equal to 6.

20. The apparatus according to claim 17, wherein the correspondence between the value of the second bit, the smallest number of the resource block in the at least one resource block indicated by the value of the second bit, and the quantity of consecutive resource blocks comprised in the at least one resource block comprises one or more items in the following table:

| Value of the second bit | Smallest number of the resource block in the at least one resource block | Quantity of consecutive resource blocks comprised in the at least one resource block |
|---|---|---|
| 21 | s | 2 |
| 22 | s | 3 |
| 23 | s | 4 |
| 24 | s | 5 |
| 25 | s | 6 |
| 26 | t-5 | 6 |
| 27 | t-4 | 5 |
| 28 | t-3 | 4 |
| 29 | t-2 | 3 |
| 30 | t-1 | 2 |

\* \* \* \* \*